United States Patent
Kramer et al.

(10) Patent No.: US 10,908,018 B2
(45) Date of Patent: Feb. 2, 2021

(54) RAPID BEAM MEASURING IN SEVERAL PLANES

(71) Applicant: Primes GmbH Messtechnik für die Produktion mit Laserstrahlung, Pfungstadt (DE)

(72) Inventors: Reinhard Kramer, Pfungstadt (DE); Otto Märten, Dreieich (DE); Stefan Wolf, Groß-Gerau (DE); Andreas Koglbauer, Hochheim am Main (DE)

(73) Assignee: PRIMES GMBH MESSTECHNIK FUR DIE PRODUKTION MIT LAS, Pfungstadt (DE)

( * ) Notice: Subject to any disclaimer, the term of this patent is extended or adjusted under 35 U.S.C. 154(b) by 14 days.

(21) Appl. No.: 16/336,154

(22) PCT Filed: Sep. 20, 2017

(86) PCT No.: PCT/DE2017/000308
§ 371 (c)(1),
(2) Date: Mar. 25, 2019

(87) PCT Pub. No.: WO2018/054405
PCT Pub. Date: Mar. 29, 2018

(65) Prior Publication Data
US 2020/0025609 A1 Jan. 23, 2020

(30) Foreign Application Priority Data
Sep. 26, 2016 (DE) .................. 10 2016 011 568

(51) Int. Cl.
*G01J 1/42* (2006.01)
(52) U.S. Cl.
CPC ..... *G01J 1/4257* (2013.01); *G01J 2001/4261* (2013.01)

(58) Field of Classification Search
CPC ............... B23K 26/705; G01J 1/4257; G01J 2001/4261
(Continued)

(56) References Cited

U.S. PATENT DOCUMENTS

| 5,064,284 A | 11/1991 | Johnston, Jr. et al. |
| 5,267,012 A | 11/1993 | Sasnett et al. |

(Continued)

FOREIGN PATENT DOCUMENTS

| DE | 3510397 A1 | 10/1986 |
| DE | 19822924 A1 | 12/1999 |

(Continued)

OTHER PUBLICATIONS

English Translation of Abstract of German Patent Application No. 3510397 dated Mar. 14, 2019.
(Continued)

*Primary Examiner* — Tri T Ton
(74) *Attorney, Agent, or Firm* — McDonnell Boehnen Hulbert & Berghoff LLP

(57) ABSTRACT

The invention relates to a method and an apparatus for the direct determination of spatial dimensions of a light beam with high precision and short measuring period, which are also suitable for the measuring of laser beams with high power in the range of the beam focus. For this purpose, an apparatus is proposed that includes a beam scanner, at least one light sensor, a movement device for the execution of a relative movement between the light beam and the beam scanner, and a device for the signal recording of a temporally variable signal of the light sensor. The beam scanner comprises at least one scanning body with at least three sampling areas, which extends along sampling lines. The sampling areas are configured for the extraction of linear or strip-shaped light samples from a cross-section of the light beam.

(Continued)

Several scanning surfaces are defined by the sampling lines of the sampling areas, each spanned by a movement vector of the relative movement. At least three scanning surfaces have a non-zero distance from one another in the direction of the axis of the light beam. The light sensor is configured for the detection of at least a portion of the sampled light extracted by the sampling areas from the cross-section of the light beam.

31 Claims, 21 Drawing Sheets

(58) Field of Classification Search
USPC .................................................. 356/121–122
See application file for complete search history.

(56) References Cited

U.S. PATENT DOCUMENTS

| 6,288,384 B1 | 9/2001 | Bahnmueller et al. |
| 2006/0158641 A1 | 7/2006 | Thomas et al. |

FOREIGN PATENT DOCUMENTS

| DE | 19909595 A1 | 9/2000 |
| DE | 102006056217 A1 | 6/2007 |
| EP | 2952861 A1 | 12/2015 |
| GB | 2507819 A | 5/2014 |
| WO | 9850196 A1 | 11/1998 |
| WO | 2011119721 A2 | 9/2011 |
| WO | 2011127400 A2 | 10/2011 |
| WO | 2015093171 A1 | 6/2015 |

OTHER PUBLICATIONS

English Translation of Abstract of German Patent Application No. 19909595 dated Mar. 14, 2019.

English Translation of Abstract of German Patent Application No. 102006056217 dated Mar. 14, 2019.

English Translation of Abstract of Patent Application No. 2015/093171 dated Mar. 14, 2019.

Signal of the light sensor, section of individual pulse (a.u.)

RAPID BEAM MEASURING IN SEVERAL PLANES

CROSS REFERENCE TO RELATED APPLICATIONS

The present application is a U.S. National Phase Application pursuant to 35 U.S.C. § 371 of International Application No. PCT/DE2017/000308 filed Sep. 20, 2017, which claims priority to German Patent Application No. 10 2016 011 0568.8 filed Sep. 26, 2016. The entire disclosure contents of these applications are hereby incorporated by reference into the present application.

FIELD OF THE DISCLOSURE

The invention relates to a method and an apparatus for the determination of spatial dimensions of a light beam. The invention is suitable for the rapid measuring of the beam caustic of a laser beam, for example. The invention makes the measuring of the beam caustic possible, even in the focus range of laser beams with high power.

BACKGROUND

The geometrical parameters of a light beam or laser beam are important magnitudes for the description of the beam. Such parameters can be a beam diameter, a beam profile, or the beam parameter product, for example. The beam parameter product describes the product of the radius of the waist of the beam, and thus the smallest radius of the beam, that may be present in a focus plane of the beam, and the aperture angle of the beam, for example, and is thus an index figure for the focusability of a light beam or laser beam. Other index figures or denotations for the same issue are the beam quality, the beam quality factor, the beam propagation factor, the mode factor, or the M squared. In many production processes in which work is performed with light beams, such as in laser material processing, for example, beam parameters must be measured for quality monitoring at regular temporal intervals.

The trend in laser material processing is to use laser beams with increasing brilliance, that is to say, laser beams with a small mode factor and high power. For example, a fundamental mode beam of a solid-state laser with a wavelength of 1 μm with a Rayleigh length of 5 mm has a waist radius of only 40 μm. In order to measure such a beam, particularly the beam focus, with a high precision, a very high spatial resolution is consequently required. Otherwise, such a beam has, at a power of 500 W, an average power density in the focus of approximately 10 MW/cm², for example. No detector is known that can handle such power densities. A direct measurement is thus problematic.

In many applications, such as laser material processing, it is frequently not sufficient to analyze and to measure a light beam or laser beam in only one plane, such as in the focus plane, for example. The geometrical form of a beam in the entire three-dimensional interaction zone has an influence on a processing process, so that precise information about the beam in several dimensions is desirable.

The beam parameter product or the mode factor can be used for the description of the propagation of a light beam or laser beam. A measurement of the beam in several cross-sections along the beam axis is necessary for the determination of the beam parameter product. The propagation of a rotationally symmetrical laser beam corresponds to the propagation of a so-called Gaussian beam, the beam radius of which along the beam axis is described with the following formula:

$$w = w_0[1+((z-z_0)z_R)^2]^{1/2} \quad \text{(Formula 1)}.$$

In this, w is the beam at the position z, wherein the z axis is the direction of propagation of the beam; $w_0$ is the radius of the waist of the beam, and thus the smallest radius of the beam; $z_0$ is the z position of the waist of the beam or of the smallest beam radius, also termed the focus position; and $z_R$ is the Rayleigh length of the beam. The Rayleigh length is the distance from the waist of the beam at which the cross-section surface of the beam has doubled. This typical course of the beam radius along the beam axis is also termed the beam caustic.

A beam can consequently be characterized in its propagation behavior by means of the three magnitudes, waist radius $w_0$, waist position $z_0$, and Rayleigh length $z_R$. It is a common measuring method to determine these three magnitudes by the measurement of the beam radius at several z positions and a fit of the measuring points to a hyperbolic function. The measuring method is described in the norm ISO 11146.

Numerous methods for the determination of the diameter or the radius of a beam are known from the state of the art and cannot be discussed individually here. Many of the known methods are expandable in such a way that even measurements in several positions along the beam axis can be carried out.

The cross-section of a beam can be measured through imaging on a spatial resolving detector, such as a camera, for example. Several successive cross-section planes of a beam can be imaged through the displacement of an imaging system and/or the camera, and a beam parameter product can thus be determined.

DE 198 22 924 A1 depicts one example of such a method. A process and a device for the measurement of the distribution of the energy field density of a laser beam are described there. Individual laser pulses are masked from the beam and locally separated from one another, and the distribution of the energy field density is measured by means of a spatial resolving measuring sensor, such as a CCD camera. In one option for the device, it is provided to displace an imaging lens by means of a z positioning and to thereby measure the beam quality.

WO 2010/125344 A1 discloses another example of such a method. This presents a process and a device for the measurement of the propagation characteristics of a light beam. The specific feature is that the imaging element and the camera are positioned in a fixed manner. The focal length of the imaging element is changed in order to scan the beam caustic along the beam axis. This is achieved through the use of a variably focusable lens, such as a controllable liquid lens, for example.

A process and a device for the characterization of a laser beam are known from DE 10 2006 056 217 A1, in which the smallest diameter of the laser beam is measured and a divergence angle of the laser beam focused with a lens is determined. The beam is focused on infinity, split into two beams, and, by means of two cameras, the diameter of the beam focused on infinity, on the one hand, and the diameter of the beam focused by a lens, on the other hand, are determined. The beam parameter product can be computed from the two diameters and the knowledge of the focal length of the lens. The process presupposes, however, that the beam was first of all correctly focused on infinity. The process consequently only focuses on specifically prepared beams and is not suitable for the automated measurement of an arbitrarily focused beam, such as in the processing zone in a laser material processing application.

A device for the analysis of laser beams is proposed in WO 2011/127400 A2, which makes possible a real-time measurement of the local beam profile, the roundness, the focal point, the astigmatism, and the propagation factor of a high power laser beam. The device comprises two highly reflecting mirrors positioned parallel to one another, which are positioned obliquely in the laser beam. A portion of the beam is consequently reflected between the mirrors many times over. A fraction of every partial beam is transmitted through the second mirror and is detected by a camera. Through the inclination of the pair of mirrors, the partial beams are laterally separated by the camera and have traveled different path lengths. Several beam cross-sections are consequently recorded by the camera at different positions along the beam axis. It is disadvantageous that all cross-sections are detected by the same detector and must therefore share the detector surface. Only a fraction of the local resolution of the detector is consequently still available for the measurement of an individual beam cross-section, so that the measuring accuracy is highly restricted.

All devices and processes that require an imaging system or other optical component for the measurement of a beam caustic irradiated by the beam have various disadvantages. On the one hand, the geometrical parameters of the beam are changed by an imaging, so that it is not possible to measure the beam characteristics directly in the area of the beam that is used for the processing. It must then be reversely calculated to the actual magnitudes of interest, such as the focus diameter or the beam profile. On the other hand, the measuring accuracy can be reduced as a result of thermal effects in the optical elements, through the use of lenses and/or other components, such as through attenuation, particularly upon measuring the radiation of high power lasers. The beam parameters are changed by thermal effects such as the focus shift, for example, which leads to temporally variable systematic measuring errors.

Furthermore, the use of cameras or other spatial resolving detectors can be disadvantageous because of the limited signal dynamics of such detectors or their digitization circuitry. If areas of the radiation field with slight intensity that lie well outside the focus position or well outside the beam axis can no longer be correctly detected because of an insufficient signal to noise interval, then this has a clear influence on the beam dimensions determined and consequently reduces the measuring accuracy.

A spatial measurement of a beam directly in the processing zone of interest, and thus in the range of the focus or the waist of the beam, without a change and influencing of the beam by means of lenses or attenuation elements, encounters great difficulties upon highly-brilliant radiation. The power densities appearing are too great for practically every type of detector, so that measurements of such radiation must usually be carried out with devices for the extraction of samples from the beam. But the means for the extraction of samples must also be able to withstand the high power densities without being damaged.

For example, WO 98/50196 discloses a device for the detection and computing of a focus position, a form, and a power distribution of a laser beam after a focusing lens. The device comprises a light affecting body and a light sensor. The laser beam and the light affecting body are movable relative to one another in order to carry out scanning movements through the laser beam. The light affecting body can be optical fibers, for example; as another alternative, reflecting bodies, such as silver-containing bodies or absorbing bodies, for example, have been proposed. The publication provides no precise information about the geometrical interactions or the light affecting bodies for the extraction of samples from the beam, so that it is unclear whether a sufficiently high local resolution can be achieved for the measurement of highly-brilliant radiation. The use of reflecting or absorbing bodies is unsuitable for the measurement of high-power radiation in the focus area. In order to determine a beam propagation factor, the beam would have to be scanned successively in several planes, which is time-consuming and requires a complex guiding device with movement in at least two axial directions.

DE 199 09 595 A1 discloses a device and a process for measuring the spatial power density distribution of radiation of high divergence and high power. A pinhole, by means of which the radiation is sampled point-by-point in several cross-sections, is used for that purpose. Through the use of a scattering body behind the pinhole, the device disclosed is suitable for the precise measuring of radiation with high divergence. It is disadvantageous that a complex drive device for the guiding of the pinhole in three axial directions is required for the point-by-point spatial scanning, and that a complete scanning of a beam caustic takes a relatively long time.

A laser beam measuring device with a rotating needle carrier and several detectors is known from DE 35 10 937 A1. By the rotation of the needle carrier, several reflecting needles positioned on the carrier are guided through a laser beam. By the reflection of the light at the needles to the detectors, samples are extracted from the laser beam. The needles traverse the beam at two different points along the beam axis. Two cross-sections of the beam are therefore sampled, whereby a beam divergence can be determined in a rough approximation under certain conditions. A complete scanning of the beam caustic is not provided with the device depicted, so that the beam parameter product cannot be determined. The device disclosed is provided for high power lasers. In order to achieve a high local resolution, the needles would have to be constructed very thin, through which the arrangement would become very fragile and the needles could bend or even be broken off during the rotation, or could be damaged upon high beam power densities. The device is thus not suitable for measuring within the focus area of a modern, highly brilliant laser beam with corresponding small waist diameters.

Another possibility for beam scanning at two points of a beam is presented in U.S. Pat. No. 5,064,284. A device for the measurement of the mode quality, which has a lens, a rotating drum with apertures (aperture openings), and a detector, is proposed there. The edges of the aperture openings sample the beam. Through different inclines of the shutter edges to the rotational axis of the drum, a beam cross-section can be sampled in two directions, so that even astigmatic beams can be measured. A beam caustic can be sampled through a change of the distance of the lens to the rotating drum. In order to measure a laser beam with high power and high brilliance, the beam would have to be attenuated in order to protect the edges of the aperture openings from the high power densities in the beam focus. The use of lenses and attenuation devices for laser beams with high power is disadvantageous, however, because thermal effects in the optical elements lead to time-dependent changes in the beam to be measured, so that the measuring accuracy is restricted.

In order to overcome the problem of long scanning times, devices are also known from the state of art, in which a complete spatial beam sample is extracted to a certain extent. For that purpose, the beam is guided through a scattering, fluorescing or luminescent medium, and the scattered light or the luminescence light is observed and measured perpendicularly to the beam axis.

EP 2 952 861 A1 depicts an example of this. In that document, a device and a process for the single shot measurements of the beam propagation factor of a laser beam are proposed, in which the beam enters into a body, the material of which has a luminescence in the wavelength range of the beam to be measured. Inside the body, a luminescence pattern in the form of the beam caustic arises, which is recorded through a plane side of the body by a photodetector. The process consequently offers advantages for the measuring of single laser pulses. It is disadvantageous that the beam parameters are changed through the refraction at the entry surface of the luminescing body, so that it is necessary to recalculate to the parameters of the original beam. In addition, the measuring of radiation with high power is problematic, because of thermal effects in the luminescent body.

WO 2011/119721 A2 discloses a device of a similar type. In the laser beam monitor depicted there, the beam is not transmitted through a specific medium, but the Rayleigh scattering of the light in the ambient medium, and thus usually air, is instead used for the observation. For that purpose, the laterally scattered light is imaged on a camera. Background light is reduced by means of an absorbing screen positioned opposite to the camera. It is problematic that the efficiency of the Rayleigh scattering is very small and that the scattered light consequently has a very low intensity. Stray light, which is produced by the finest dust particles in the air, has an intensity that is many times greater. The determination of the beam diameter from the camera images is made more difficult through such influences of disturbing light and leads to fluctuating findings with low measuring accuracy. Individual light disturbances from dust can be reduced by image evaluation algorithms, but essentially very clean ambient air is required, however. In typical industrial applications, such as in laser material processing, the ambient air is generally not particularly clean, because of the welding fumes appearing in laser material processing, among other reasons. The precision of this measuring process is highly restricted under these conditions.

The known methods for the measurement of spatial dimensions or the propagation factor of a light beam accordingly have various disadvantages, such as the change of the beam parameters through imaging, susceptibility to thermal effects, insufficient suitability for radiation with very high power, restricted measuring accuracy, or long measuring times. The disadvantages are of particular importance in the measuring of highly brilliant laser radiation with high power in the focus area of the beam.

A need consequently exists for a solution of the problem of determining the spatial dimensions of a light beam or laser beam directly in the focus area with a high precision and a short measuring period, particularly upon high beam powers.

SUMMARY

The task of this invention is to provide a method and an apparatus for the direct determination of spatial dimensions of a light beam with high precision and short measuring period, which are also suitable for the measuring of laser beams with high power in the range of the beam focus.

For the solution of this task, an apparatus is proposed for the determination of spatial dimensions of a light beam, which apparatus contains a beam scanner, at least one light sensor, a movement device for the execution of a relative movement between the light beam and the beam scanner, and a device for the signal recording of a temporally variable signal of the light sensor. The beam scanner comprises at least one scanning body with at least three sampling areas. The sampling areas have an extent along sampling lines that is greater by at least a factor of ten than the extent of the sampling areas transversely to the sampling lines. Furthermore, the sampling areas are configured for the extraction of linear or strip-shaped light samples from cross-sections of the light beam. The sampling areas have a transverse distance from one another that, in a projection of the sampling areas on a plane perpendicular to the axis of the light beam, is greater along a track formed by the relative movement of the light beam than a diameter of the light beam in the range of the light beam to be scanned. Several scanning surfaces are defined by the sampling lines of the sampling areas, each spanned by a movement vector of the relative movement. At least three scanning surfaces have, in the direction of the axis of the light beam, non-zero distances from one another. The light sensor is configured for the detection of at least a portion of the sampled light of the light samples extracted by the sampling areas from the cross-sections of the light beam.

An embodiment of the apparatus, in which the sampling areas are positioned on a surface of the scanning body or inside the scanning body, is provided.

In a possible embodiment, the range of the relative movement, that is executable by the movement device for the relative movement between the light beam and the beam scanner, corresponds to at least three times the transverse distance between proximate sampling areas.

The sampling areas can have an extent transversely to the sampling lines that is at most half the smallest beam diameter of the light beam to be scanned.

The apparatus can be configured for the successive scanning of at least three different cross-sections of the light beam by means of the sampling areas in an individual movement sequence of the movement device.

An embodiment is also provided in which the distance between the scanning surfaces, which are positioned at the greatest distance in the direction of the axis of the light beam, corresponds to at least one Rayleigh length of the light beam to be scanned.

In a possible embodiment, the movement vector of the relative movement can be aligned at an angle between 45° and 135° or between −45° and −135° to the axis of the light beam.

In another possible embodiment, the sampling lines of the sampling areas can be aligned at an angle between 45° and 135° or between −45° and −135° to the axis of the light beam.

An embodiment is also provided in which the sampling lines of the sampling areas are aligned at an angle between 10° and 170° or between −10° and −170° to the movement vector of the relative movement.

In a possible embodiment, the sampling areas can be configured for the guiding of at least a portion of the sampled light, which is extracted by the sampling areas from a cross-section of the light beam, in a direction deviating from the propagation of the entire light beam.

The sampling areas can have a light-deflecting structuring or a light-scattering structuring.

The sampling areas can also be formed by linear or strip-shaped coatings on the scanning body.

In a further embodiment, the sampling areas can be formed by linear or strip-shaped gaps in a reflective coating of the scanning body.

An embodiment of the device is provided in which the scanning body has at least four sampling areas and wherein at least four scanning surfaces have a non-zero distance from each other in the direction of the axis of the light beam.

An embodiment is also provided, in which the scanning body has at least ten sampling areas.

The scanning body can have an absorptance of a maximum of 0.1%.

In another possible embodiment of the invention, the device comprises a second scanning body with at least three second sampling areas. The second sampling areas have an extent along second sampling lines that is greater than the extent of the second sampling areas transversely to the second sampling lines by a factor of at least ten.

The second sampling lines of the second sampling areas can enclose a non-zero angle with the sampling lines of the sampling areas of the scanning body.

Several second scanning surfaces can be defined by the second sampling lines of the second sampling areas, each spanned by the movement vector. The second scanning surfaces and the scanning surfaces can be positioned displaced from one another in the direction of the axis of the light beam.

In a possible embodiment, the second scanning body can be a component of the beam scanner.

An embodiment is also provided, in which the apparatus comprises a second beam scanner, as well as a second movement device for the execution of a second relative movement between the second beam scanner and the light beam. The second scanning body is a component of the second beam scanner, and a second movement vector of the second movement device encloses a non-zero angle with the movement vector of the movement device.

The relative movement can be a linear movement.

The relative movement can also be a rotary movement.

In another possible embodiment, the apparatus comprises an evaluation device for the determination of at least one parameter from the following group of parameters of the light beam: dimensions of cross-sections of the light beam in a direction perpendicular to the sampling line, a beam diameter in several positions along the axis of the light beam, an axial focus position, a focus diameter, a divergence angle, and a beam parameter product.

The apparatus can be used for the determination of spatial dimensions of a laser beam.

A method for the determination of spatial dimensions of a light beam with the following method steps is also proposed for the solution of the task. By means of a movement device, a relative movement is executed between a beam scanner and the light beam. By means of several sampling areas, linear or strip-shaped light samples are extracted from several cross-sections of the light beam, wherein the beam scanner comprises at least one scanning body with at least three sampling areas. At least a portion of the sampled light of the light samples, which are extracted by the sampling areas from the cross-sections of the light beam, is detected by means of a light sensor. A temporally variable signal of the light sensor is recorded by means of a device for signal recording. The sampling areas have an extent along sampling lines that is greater than the extent of the sampling areas transversely to the sampling lines by at least a factor of ten, and the sampling areas have a transverse distance from one another that is, in a projection of the sampling areas on a plane perpendicular to the axis of the light beam, greater along a track of the light beam formed by the relative movement than a diameter of the light beam in the range of the light beam to be scanned. Furthermore, several scanning surfaces are defined by the sampling lines of the sampling areas, each spanned by the movement vector, and at least three scanning surfaces have, in the direction of the axis of the light beam, a non-zero distance from each other.

A method is also provided in which at least three different cross-sections of the light beam are successively sampled in an individual movement sequence of the movement device by means of the sampling areas.

In another possible method, the sampling areas have an extent, transversely to the sampling lines that is, at most, half the smallest half beam diameter of the light beam to be scanned.

A method with the following additional method steps is additionally provided. Signal pulses in the recorded signal of the light sensor are assigned to scanned cross-sections of the light beam. Pulse durations of the signal pulses are determined in the recorded signal of the light sensor. Dimensions of the cross-sections are computed from the pulse durations of the signal pulses and from a speed of the relative movement.

A method is also provided in which a beam propagation factor or a beam parameter product is computed from the dimensions of the cross-sections.

Finally, a method with the following additional method step is also provided. Linear or strip-shaped light samples are extracted from several cross-sections of the light beam by means of at least three second sampling areas of a second scanning body. The second sampling areas have an extent along second sampling lines that is greater than the extent of the second sampling areas transversely to the second sampling lines by a factor of at least ten, and the second sampling lines of the second sampling areas enclose a non-zero angle with the sampling lines of the sampling areas of the scanning body.

BRIEF DESCRIPTION OF THE FIGURES

The invention is depicted in further detail by means of the following figures, without being restricted to the embodiments and examples depicted. On the contrary, embodiments are also provided in which several characteristics depicted in different figures can be combined. These depict the following.

DETAILED DESCRIPTION

Figure 1:
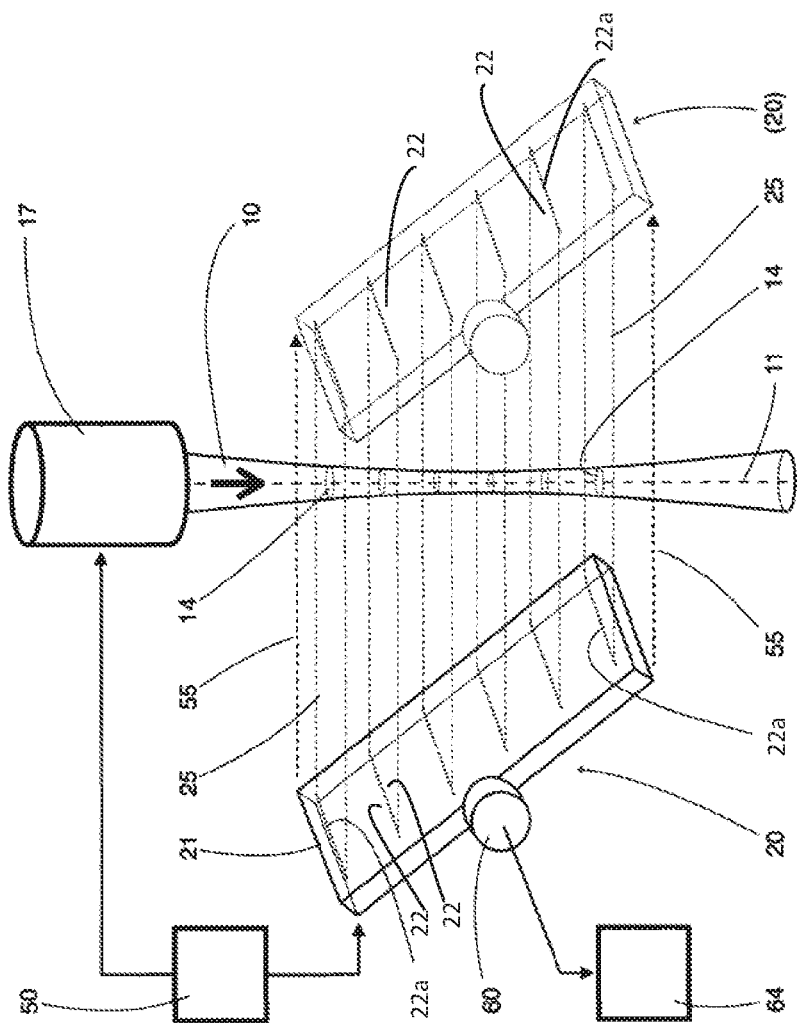
FIG. 1 is a schematic, partially perspective representation of a first embodiment of the invention with a plate-shaped scanning body.

A first possible embodiment of the invention is schematically depicted in FIG. 1. The device in accordance with the invention comprises a beam scanner 20, a light sensor 60, a movement device 50 and a device 64 for signal recording. The beam scanner 20 comprises a scanning body 21 with several sampling areas 22. In the example of implementation depicted, the scanning body 21 is a plate made from a transparent optical material. The sampling areas 22 extend along sampling lines 22a and have, in this example of implementation, a linear, strip-shaped or bar-shaped form. The sampling areas are configured in such a way as to direct light in a direction that deviates from the direction of propagation of a light beam 10 to be measured. For that purpose, the sampling areas 22 can have a light-scattering structure, for example. In the example depicted, the sampling areas 22 are positioned on a surface of the scanning body 21 or inside the scanning body 21 close to a surface of the scanning body. The surface of the scanning body 21 is inclined relative to the axis 11 of the light beam 10. The light beam 10 can be emitted having circular or elliptical cross-sections 14 from a device 17 for the transmission of a light beam. These circular or elliptical cross-sections have a measurable diameter. The movement device 50 is configured for the execution of a relative movement between the beam scanner 20 and the light beam 10. In the example depicted, the beam scanner 20 is moved through the light beam 10 by means of the movement device 50. The sampling areas 22 successively penetrate various cross-sections 14 of the light beam 10. Every sampling areas 22 forms a scanning surface 25, along with the relative movement of the movement vector 55. The scanning surfaces 25 are positioned parallel to one another and have a distance from one another. The scanning surfaces 25 can be aligned, as in the example depicted, approximately perpendicularly to the axis 11 of the light beam 10. During the execution of the relative movement, several cross-sections 14 of the light beam 10 are consequently scanned in different positions along the axis 11 of the light beam 10. Upon the penetration of a cross-section 14, a sampling area 22 extracts, because of its form, a linear or a strip-shaped light sample from the cross-section 14. The sampled light that is extracted spreads out in different directions. A portion of the sampled light is detected by the light sensor 60. The light sensor 60 can be positioned for that purpose laterally on the scanning body 21, for example. The electrical signal produced by the light sensor 60 is recorded by the device 64 for the recording of signals.

Figure 2A:
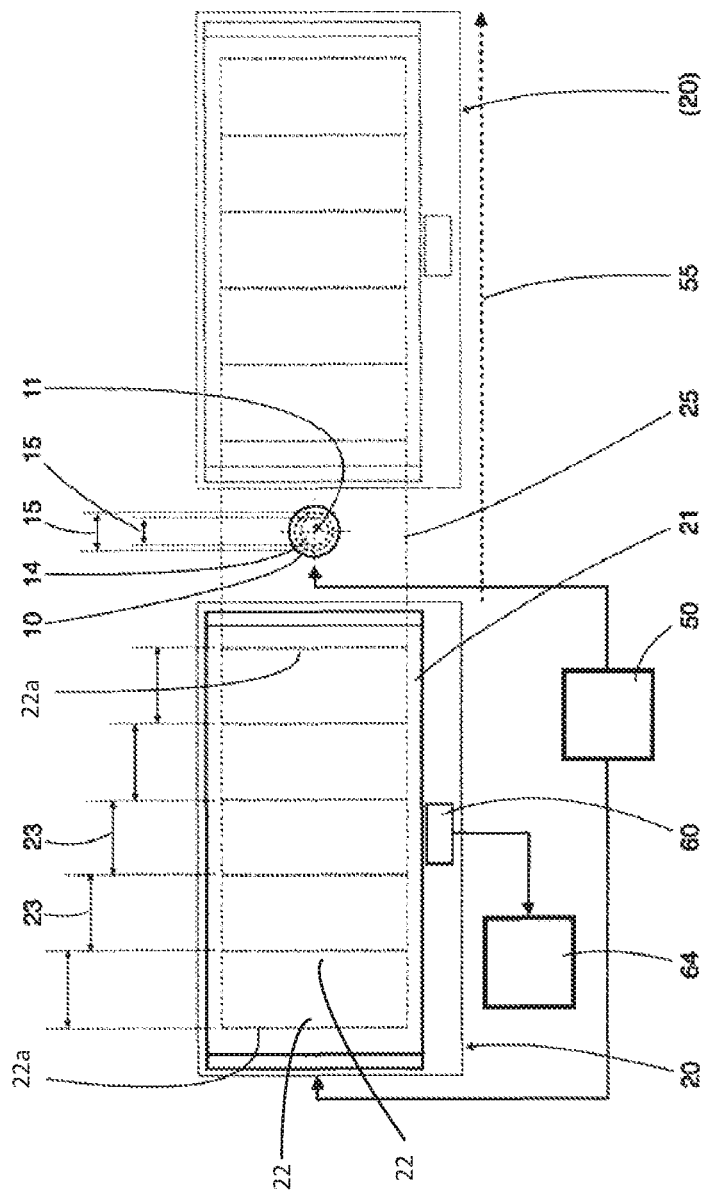
FIG. 2a is a schematic representation of the first embodiment depicted in FIG. 1 in a view from above.
Figure 2B:
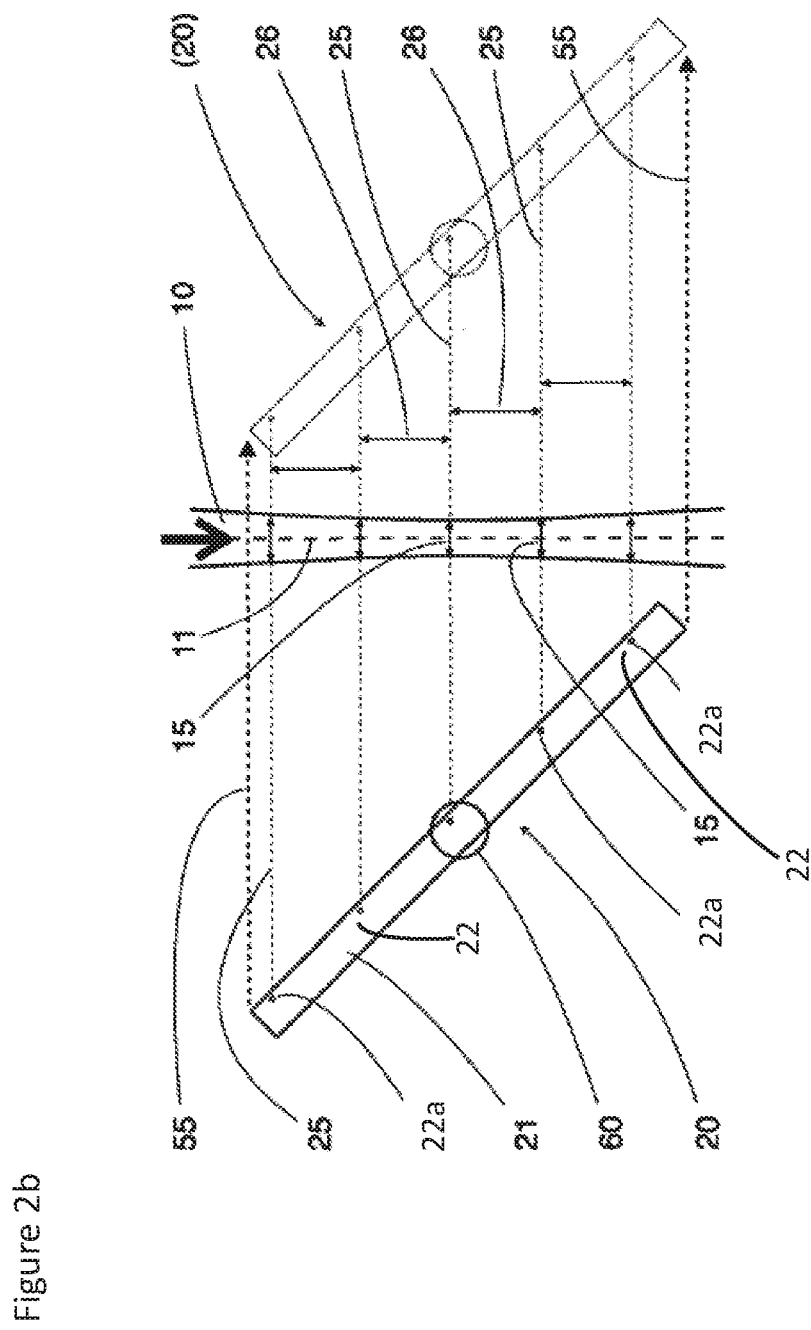
FIG. 2b is a partial representation of the first embodiment depicted in FIG. 1 in a lateral view.

FIGS. 2a and 2b depict the example of implementation depicted in FIG. 1 in additional views. FIG. 2a is a schematic view from above of the device. The view from above is, in this case, simultaneously a projection onto a plane perpendicular to the axis 11 of the light beam 10. The sampling areas 22 have, in this projection, a transverse distance 23 from one another. The transverse distance 23 is greater than the diameter 15 of the various cross-sections 14 of the light beam, which are scanned by the sampling areas 22. The device 17 for the transmission of the light beam 10 is not depicted in the view from above.

FIG. 2b is a lateral view of the device in the embodiment depicted in FIGS. 1 and 2a. For the purpose of a better view, the movement device 50 and the device 17 for the transmission of the light beam 10 are not depicted in this view. The scanning surfaces 25 spanned by the sampling areas 22 and the movement vector 55 have a distance 26 from one another.

Figure 3:
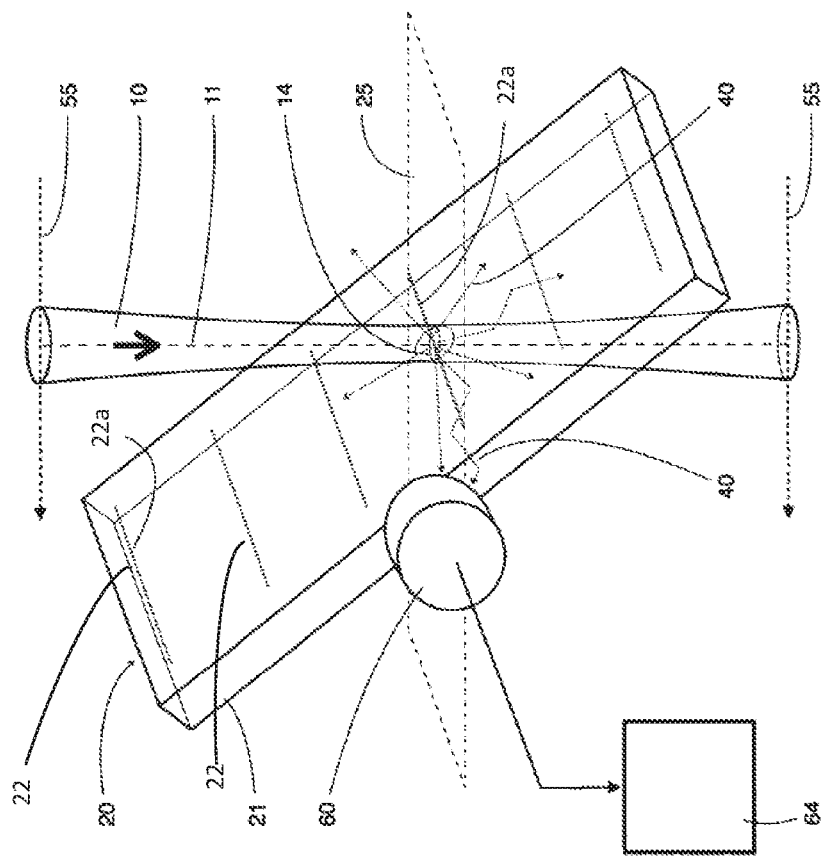
FIG. 3 is a partial representation of an embodiment of the invention during the scanning process.

In FIG. 3, the invention is partially depicted during a scanning process. During the relative movement of the light beam 10 relative to the beam scanner 20, the scanning body 21 is guided through the light beam 10. Conversely, the light beam 10 can also be guided across the scanning body 21 by means of the movement device 50. In every case, different cross-sections 14 of the light beam 10 traverse the sampling areas 22 in succession. If a sampling area 22 traverses a cross-section 14, then the sampling area 22 extracts a linear or strip-shaped light sample from the cross-section 14 of the beam. In the example of the implementation depicted, the sampling areas 22 have light-scattering structures, for example. The sampled light 40 is then a radiation from the strip-shaped light sample of the light beam 10 that is scattered in different directions. A portion of the sampled light 40 is detected by the light sensor 60, which converts the intensity momentarily recorded into a proportional electrical signal. The electrical signal is recorded by the device 64 for signal recording.

Figure 4A:
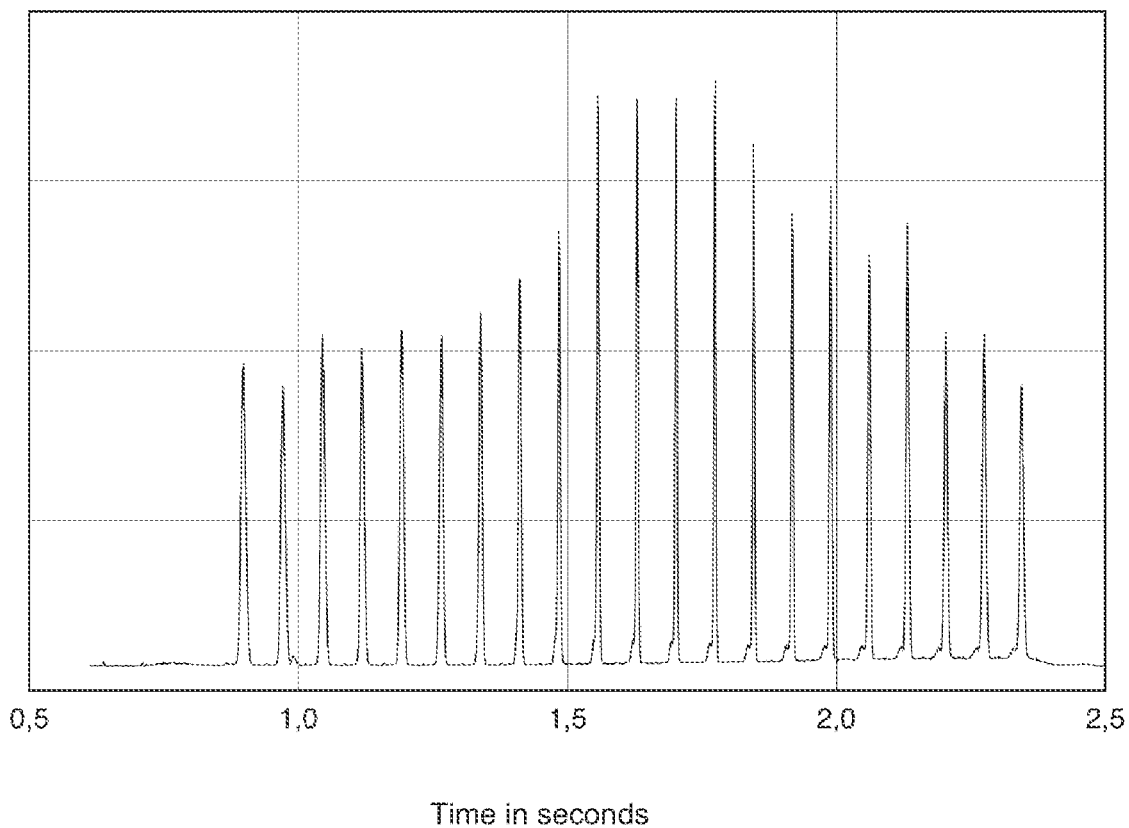
FIG. 4a is an experimental example of the recorded signal of the light sensor upon a measuring of a laser beam with the device in accordance with the invention.

FIG. 4a depicts an example of a recorded signal of the light sensor 60. In this experimental example, a laser beam 10 was guided over the beam scanner 20 at a speed of 0.01 m/s. The total of 21 pulses in the signal course here correspond to 21 sampling areas 22 in the scanning body 21 that have traversed the beam. The width or the duration of an individual signal pulse, respectively, correlates with the width of the beam cross-section in the corresponding scanning surface 25.

Figure 4B:
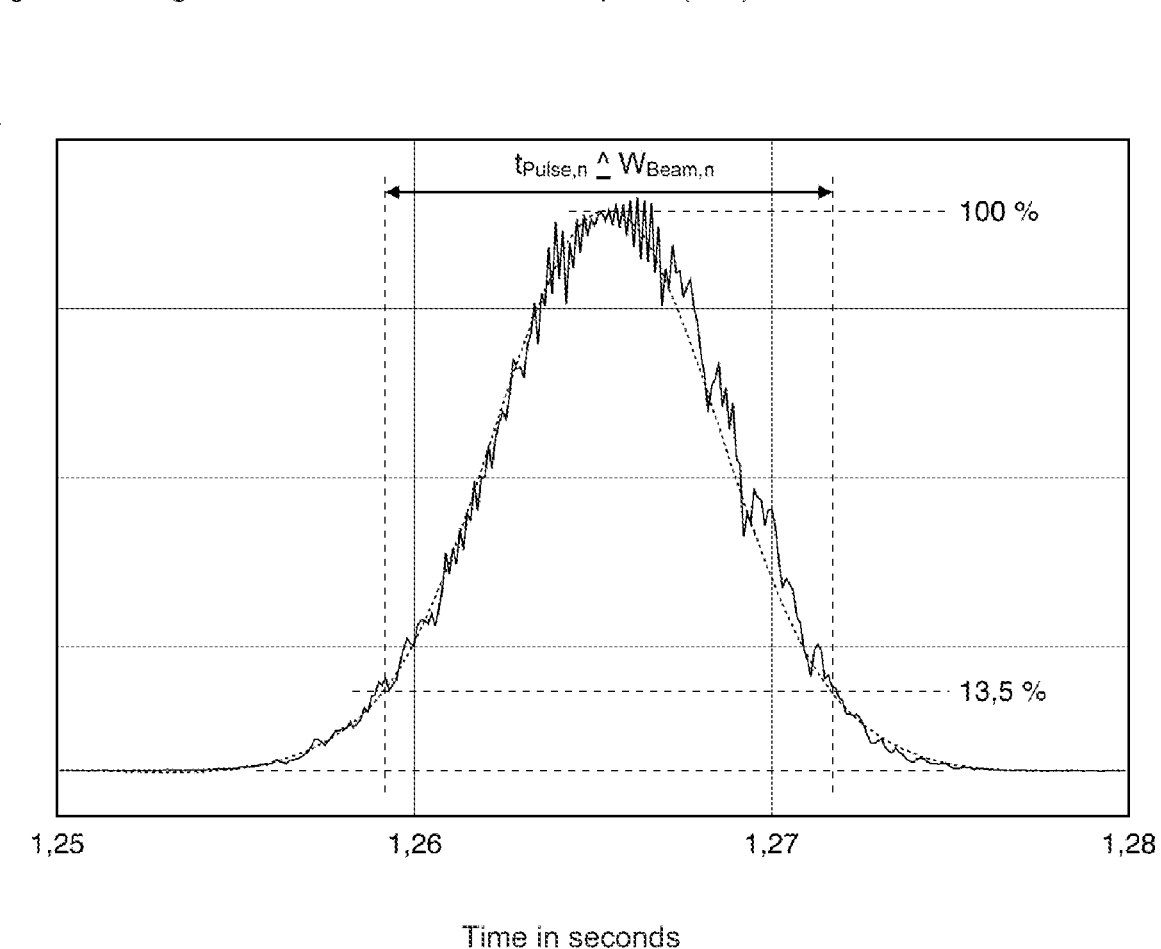
FIG. 4b is a section of the recorded signal of the light sensor. The sixth signal pulse of the signal depicted in FIG. 4a is depicted here.

A section from the signal course of the light sensor 60 depicted in FIG. 4a is depicted in FIG. 4b. The sixth signal pulse from the signal course is depicted. The temporal course of the pulse can, in this example, be approximated very well by a Gaussian curve, which is indicated in the image as a narrow dotted curve. In this case, the sampled beam cross-section accordingly has a Gaussian intensity distribution. The determination of the duration of the pulse can, for example, be carried out by the search for the points on which the signal has fallen to $1/e^2$, and thus to 13.5% of the maximum intensity. The determined pulse duration $t_{Pulse}$ here amounts to approximately 0.0125 seconds. The pulse duration correlates with the width of the scanned beam cross-section, which can be computed by multiplication of the pulse duration by the scanning speed. Upon the assumption of a rotationally symmetrical beam, the beam radius $w_{Beam}$ determined accordingly amounts to approximately 0.0625 mm at the corresponding scanning surface or z position (that is to say, position along the beam axis).

Figure 5:
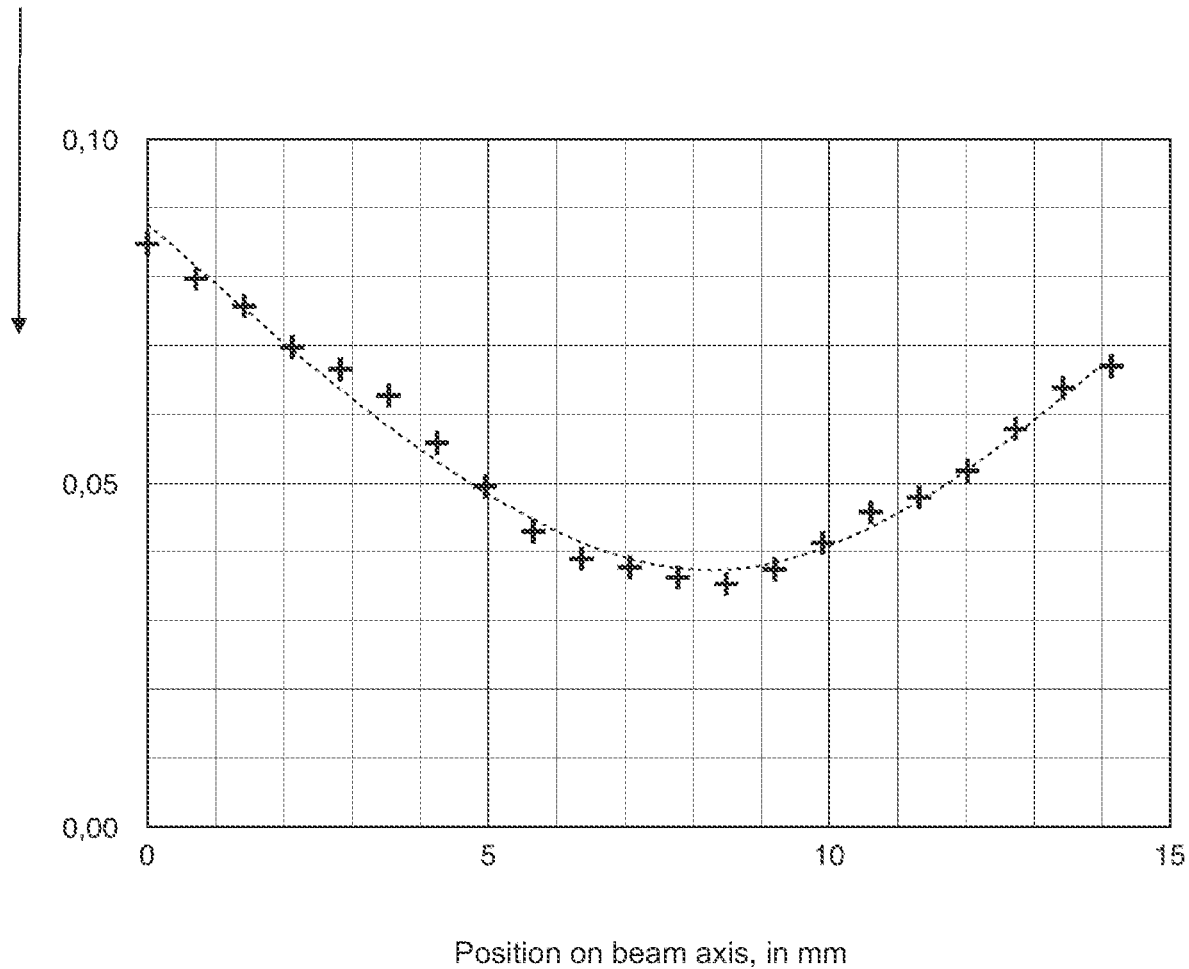
FIG. 5 is a plot of the beam radii, which were determined from the signal depicted in FIG. 4a, against the axial position (representation of the beam caustic).

FIG. 5 depicts a plot of the beam radii against the axial position. The plot represents the beam caustic of the scanned beam. The beam radii were determined from the signal depicted in FIG. 4a. The measuring points can be approximated by means of a function in accordance with Formula 1. The corresponding fit for the measuring points is given as a dotted curve. The following beam parameters were determined for this measurement: focus position 8.2 mm, waist radius 0.0372 mm, Rayleigh length 3.85 mm. The far field divergence full angle resulting is 19.3 mrad, and the beam parameter product amounts to 0.359 mm*mrad. This accordingly involves a fundamental mode beam with a beam propagation factor (mode factor or M squared) of approximately $M^2=1.06$.

Figure 6:
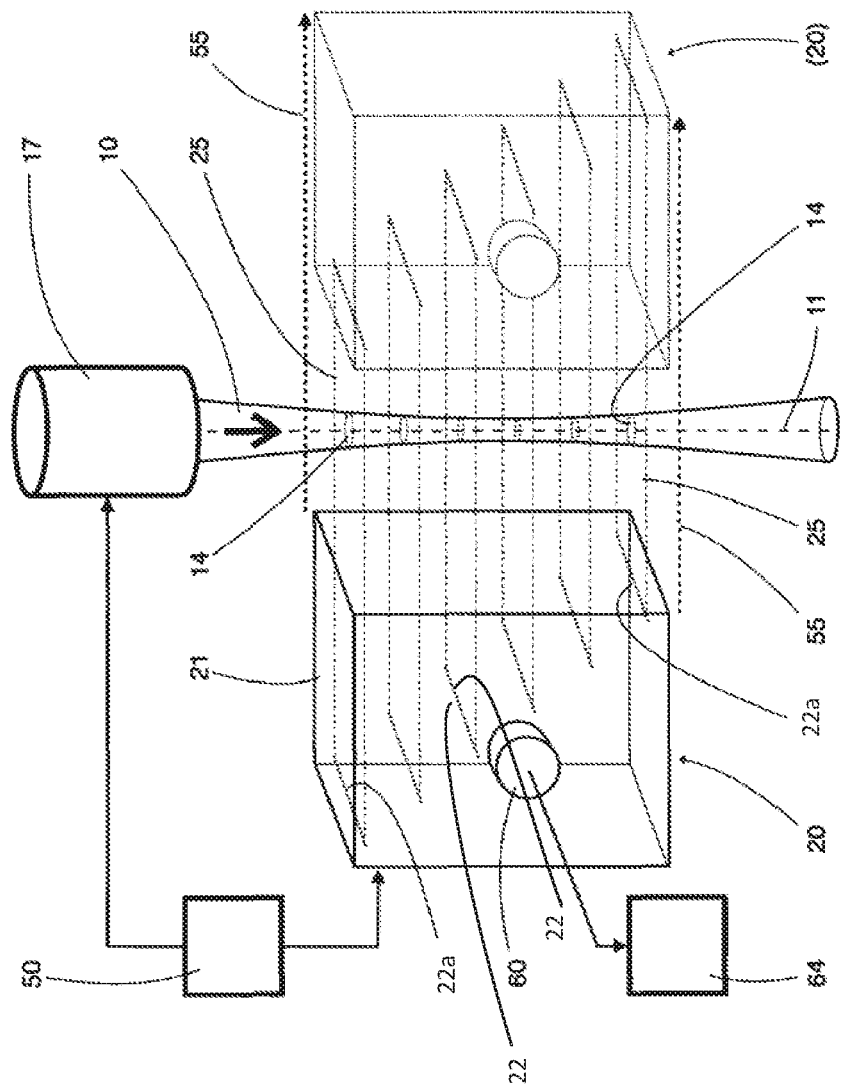
FIG. 6 is a schematic, partially perspective representation of one example of implementation of the first embodiment of the invention with a block-shaped scanning body.

An example of implementation of the invention similar to the first embodiment depicted in FIG. 1 is depicted in FIG. 6. The scanning body 21 is, in this example, not an inclined plate but, rather, a block from a transparent optical material. The sampling areas 22 are positioned along an imaginary diagonally-proceeding surface inside the block-shaped scanning body 21. For the rest, this example of implementation corresponds to the embodiment depicted in FIG. 1.

Figure 7:
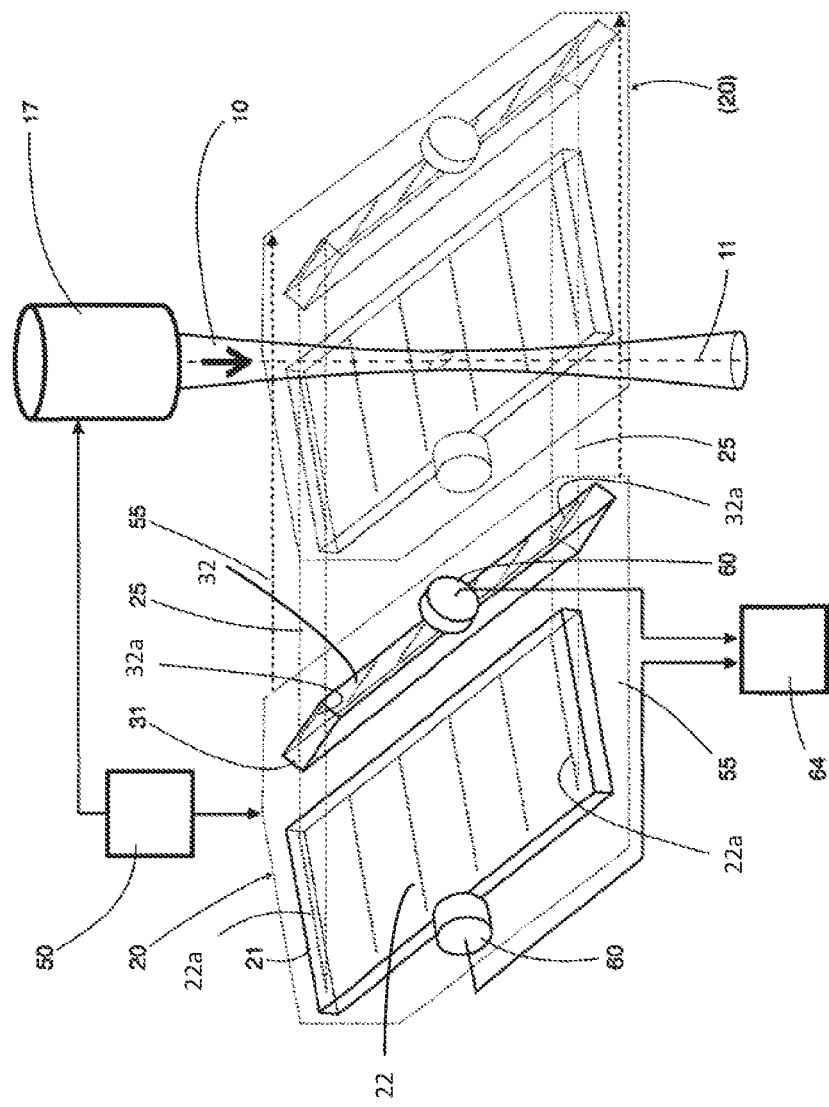
FIG. 7 is a schematic, partially perspective representation of a second embodiment of the invention with a second scanning body, the second sampling areas of which are positioned at an angle to the sampling areas of the first scanning body.

FIG. 7 depicts a second possible embodiment of the invention. The beam scanner 20 here comprises two scanning bodies 21, 31. The second scanning body 31 has several second sampling areas 32 in a manner identical to that of the scanning body 21. An additional light sensor 60 can be assigned to the second scanning body 31. The sampling lines 22a of the sampling areas 22 of the scanning body 21 are not aligned or positioned perpendicularly to the movement vector 55, but are instead inclined by 45° to the movement vector 55, for example. The scanning body 21 is for that purpose positioned correspondingly obliquely to the movement vector 55 and can be designed as a trapezoidal plate. The second sampling lines of the second sampling areas 32 of the second scanning body 31 are likewise not aligned perpendicularly to the movement vector 55, but are instead inclined by −45° to the movement vector 55, for example. The second sampling lines of the second sampling areas 32 draw an angle with the sampling lines of the sampling areas 22, which accordingly amounts to 90° in this example. In other words, the second sampling areas 32 are positioned perpendicularly to the sampling areas 22. The second scanning body 31 can be positioned in such a way that the second sampling areas 32 each lie in the same scanning surfaces 25 of the sampling areas 22 as spanned by the movement vector 55. In this way, the cross-sections 14 of the light beam 10 successively are scanned in two different directions if the beam scanner 20 is guided through the light beam 10. As a result, the dimensions of the beam cross-sections can thereby be determined in two directions, which makes the measuring of elliptical or astigmatic beams possible.

Figure 8A:
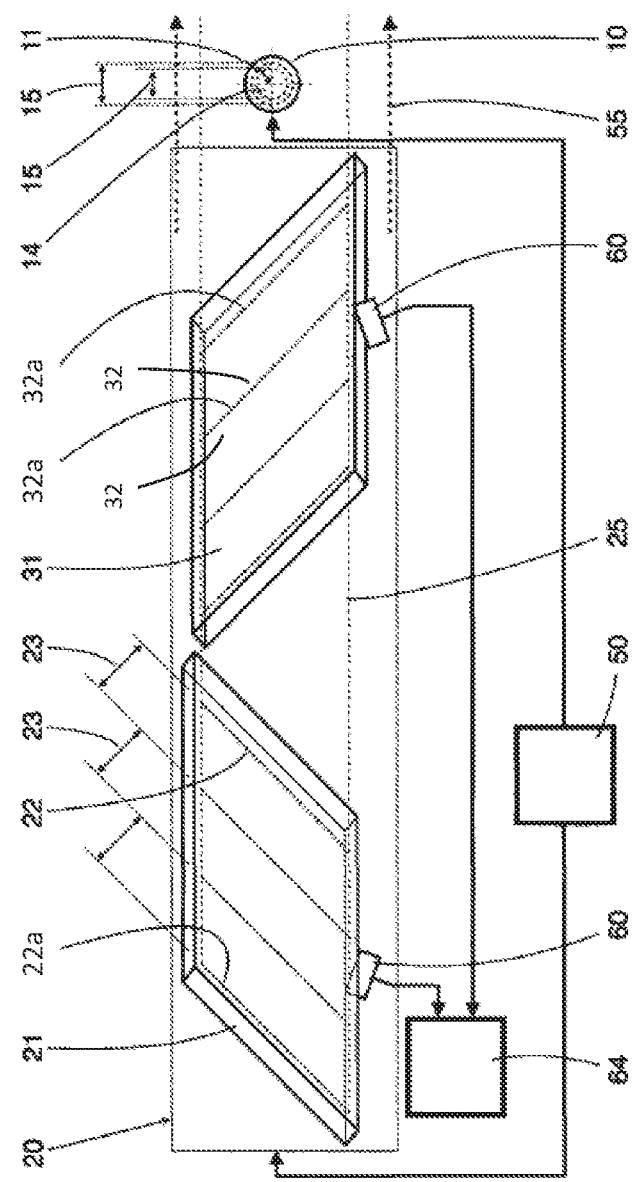
FIG. 8a is a schematic representation of the second embodiment depicted in FIG. 7 in a view from above.
Figure 8B:
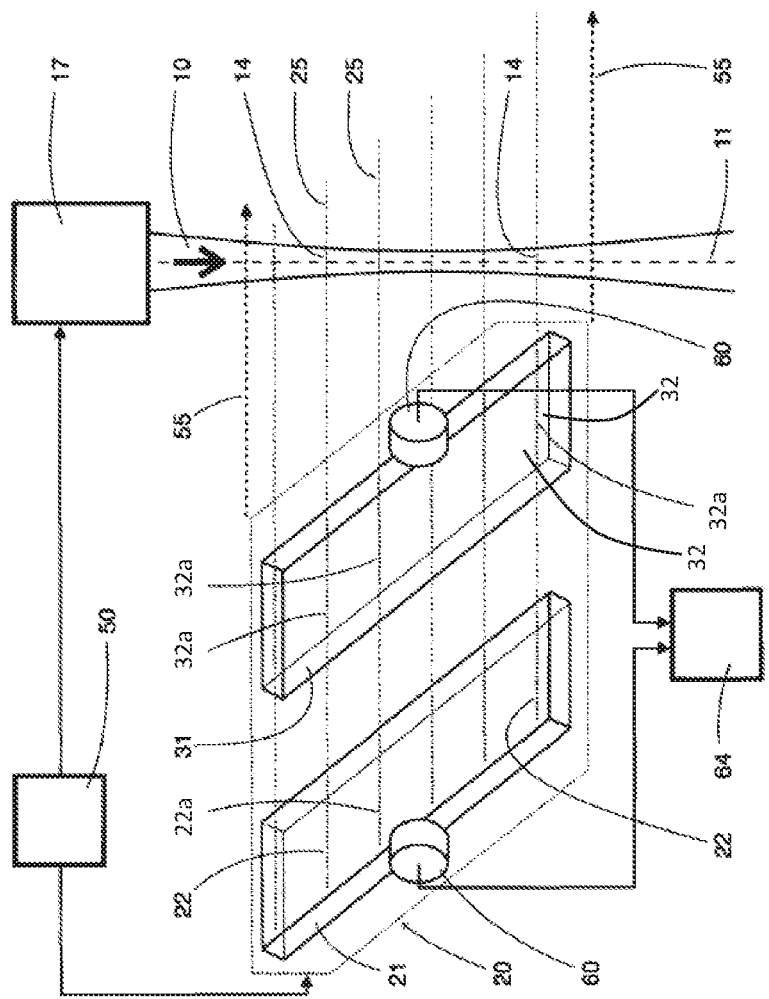
FIG. 8b is a schematic representation of the second embodiment depicted in FIG. 7 in a lateral view.

FIGS. 8a and 8b depict the second embodiment depicted in FIG. 7 in a view from above, as well as in a lateral view. The view from above (FIG. 8a) of the beam scanner 20 of the apparatus shows that the sampling areas 22 of the scanning body 21 and the second sampling areas 32 of the second scanning body 31 enclose an angle that, in the example depicted, amounts to approximately 90°. The sampling areas 22 have a transverse distance 23 from one another. The second sampling areas 32 of the second scanning body 31 likewise have a transverse distance from one another. The transverse distance 23 is greater than the diameter 15 in the various cross-sections 14 of the light beam that are sampled by the sampling areas 22 and the second sampling areas 32.

FIG. 8b is a lateral view of a second embodiment of the invention as depicted in FIG. 7 and FIG. 8a. In the example of implementation depicted, the second scanning body 31 has as many second sampling areas 32 as the scanning body 21 has sampling areas 22. Each sampling area 22 and a second sampling area 32 are positioned in the same scanning surface 25, so that every cross-section 14 of the light beam 10 is sampled in two scanning directions. In this example of implementation, all scanning surfaces 25 have a non-zero distance from each other in the direction of the axis 11 of the light beam 10. A light sensor 60, the signals of which are recorded by the device 64 for signal recording, is assigned to each of the two scanning bodies 21 and 31.

Figure 9:
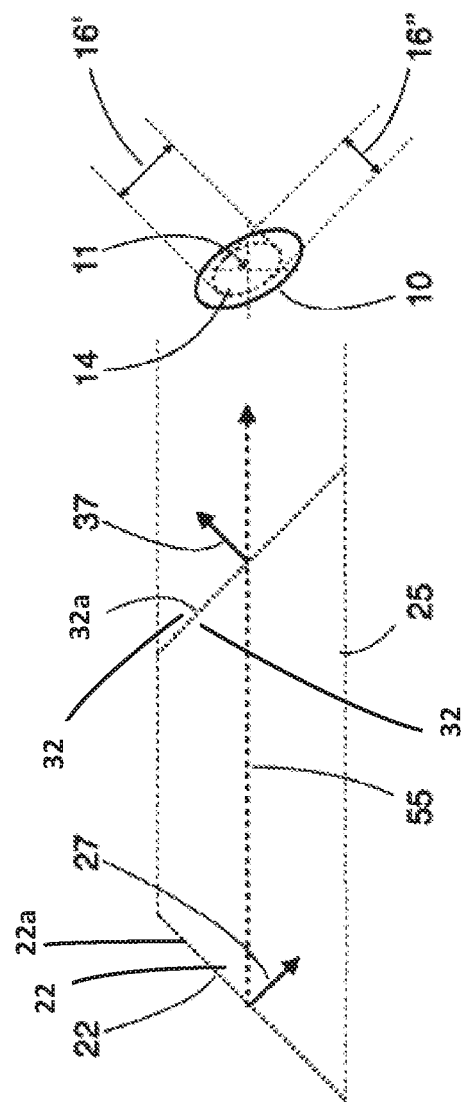
FIG. 9 is a diagram for the representation of the two effective scanning directions within a scanning surface in an embodiment of the invention with two scanning bodies corresponding to FIGS. 7, 8a and 8b.

FIG. 9 schematically depicts the possibilities for the determination of dimensions of a beam cross-section 14 with a device in accordance with FIG. 7 or 8a and 8b, respectively. By way of example, a sampling area 22 of the scanning body 21 and a second sampling area 32 of the second scanning body 31, which are located in the same scanning surface 25, are depicted in the figure. During the scanning of a beam cross-section 14 by a sampling areas, the dimension of the beam cross-section 14 can be determined only in a direction transverse to the sampling line or perpendicularly to the sample axis of the sampling areas, respectively. The sample axis here is the local tangent on the sampling line. The effective (that is to say, efficacious) scanning direction of a sampling area is therefore the normal direction of the sample axis of the sampling areas. The effective scanning direction 27 of the sampling area 22 is, in this example, inclined 45° to the movement vector 55, so that the dimension 16' of the beam cross-section 14 can be determined from the scanning signal of the sampling area 22. The effective scanning direction 37 of the second sampling area 32 is, on the other hand, aligned −45° to the movement vector 55, and consequently serves for the determination of the dimension 16" of the beam cross-section 14. The two effective scanning directions 27 and 37, therefore, are perpendicular to one another in this example. The light beam 10 to be measured is, in this example, elliptical or astigmatic, and therefore has an elliptical cross-section 14 in the scanning surface 25. By means of the determination of two dimensions 16', 16", it is possible to determine the ellipticity of the beam cross-section but only, however, if the primary axes of the ellipse are aligned approximately in the direction of the effective scanning directions 27, 37.

Figure 10:
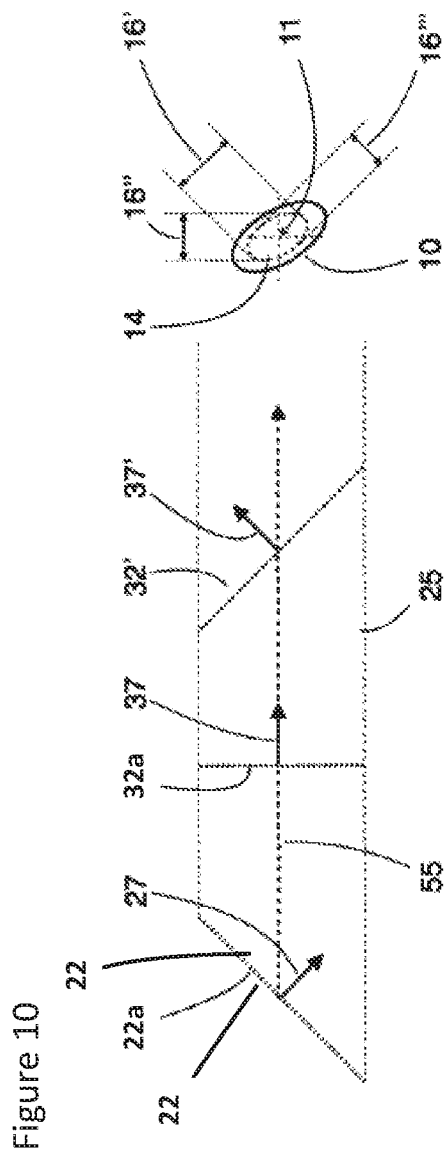
FIG. 10 is a diagram for the representation of three effective scanning directions within a scanning surface in an embodiment of the invention with three scanning bodies.

One additional possibility for the determination of dimensions of a beam cross-section 14 is schematically depicted in FIG. 10. In this example, the beam scanner 20 comprises three scanning bodies 21, 31 and 31', which are not depicted here. One sampling area of each scanning body is depicted. The sampling areas from the various scanning bodies have different orientations to the movement vector 55. Here, the scanning directions 27, 37 and 37' of the sampling areas 22, 32 and 32' are inclined by 45°, 0°, as well as −45° to the movement vector 55, so that three different dimensions 16', 16", 16''' of the beam cross-section 14 can be determined. By means of three different scanning directions, it is possible not only to determine the dimensions of a cross-section 14 in two axial directions, but the orientation of the primary axes of an elliptical beam cross-section 14 can additionally be reconstructed by means of the determination of three dimensions, and the ellipticity of elliptical or astigmatic beams can consequently be measured in any arbitrary orientations. For this purpose, the angles of inclination of the effective scanning directions or sampling areas, may not amount to precisely 45°, 0° and −45°, but another angles of inclination are also possible, such as 60°, 0° and −60°, for example.

Figure 11:
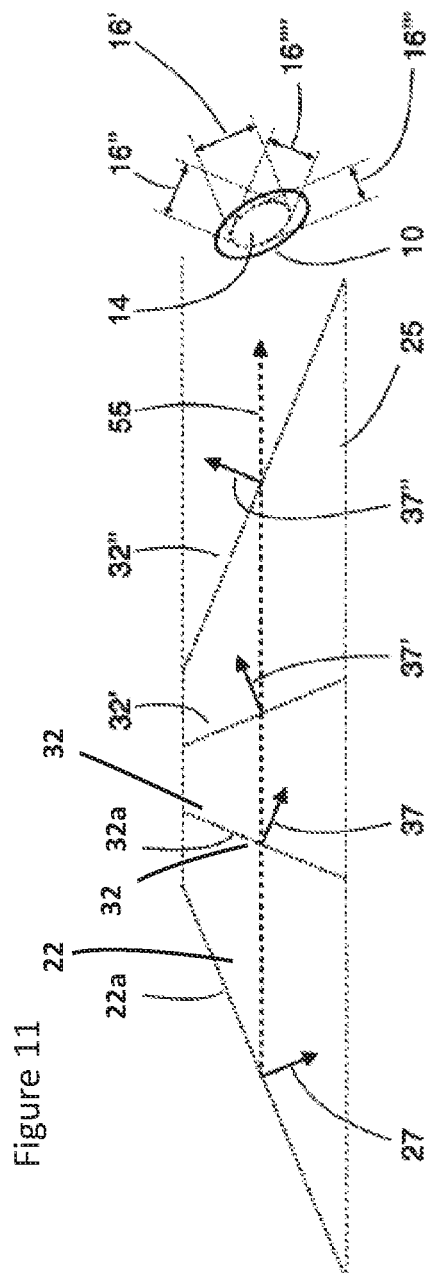
FIG. 11 is a diagram for the representation of four effective scanning directions within a scanning surface in an embodiment of the invention with four scanning bodies, which makes a quasi-tomographic scanning of the beam cross-sections possible.

FIG. 11 schematically depicts yet another additional possibility for the determination of dimensions of a beam cross-section 14 with a non-radially symmetrical form. In the example depicted here, the beam scanner 20 comprises four scanning bodies 21, 31, 31' and 31" (not in depicted in the figure). For the rest, this example essentially corresponds to the example of implementation depicted in FIG. 10. One sampling area from every scanning body from the same scanning surface 25 is depicted. The sampling areas from the various scanning bodies have various orientations to the movement vector 55. In this example, the scanning directions 27, 37, 37' and 37" of the sampling areas 22, 32, 32' and 32" are inclined by 67.5°, 22.5°, −22.5°, as well as −67.5° to the movement vector 55. Four different dimensions 16', 16", 16''', 16'''' can consequently be determined from the beam cross-section 14. As shown in the explanations to FIG. 10, three different scanning directions are already sufficient for the complete determination of the geometrical parameters of an elliptical beam cross-section 14, that is to say, for the determination of the two dimensions in the primary axial directions and the orientation of the primary axes. The fourth different scanning direction consequently already provides redundant information. The redundant information can be used for the increase of the precision of the determination of the dimensions of the beam cross-section 14. It is also possible, however, to reconstruct the entire beam profile in the beam cross-section sampled from the scanning signals of the various scanning directions in a process similar to tomography.

Figure 12:
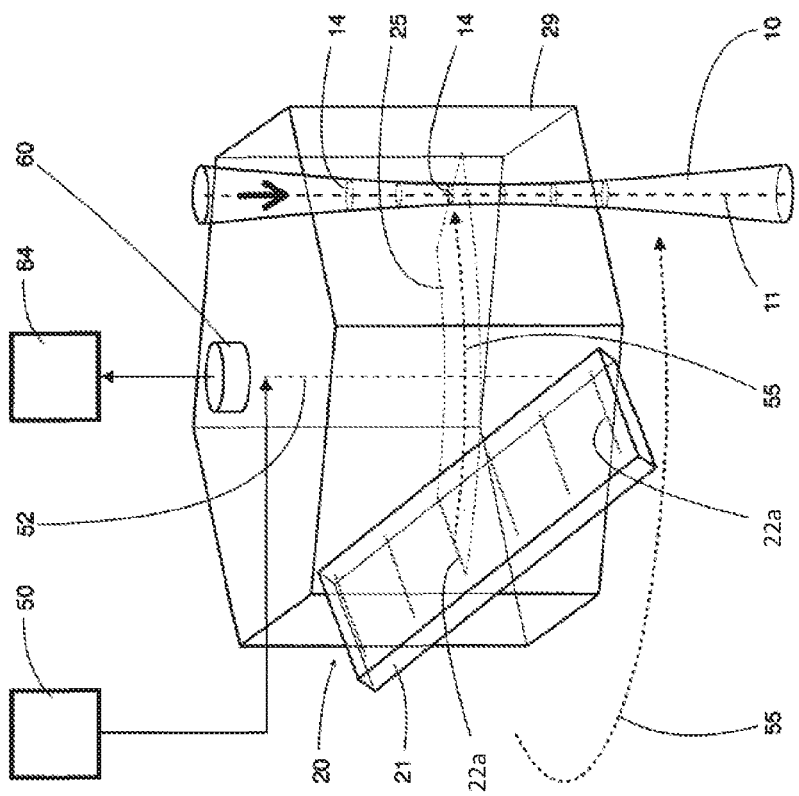
FIG. 12 is a schematic, partially perspective representation of a third embodiment of the invention, in which the relative movement is executed by a rotary movement of the beam scanner.

A third possible embodiment of the invention is depicted in FIG. 12. In this example of implementation, the relative movement between the light beam 10 and the beam scanner 20 is executed as a rotary movement of the beam scanner 20. The beam scanner 20 has for that purpose a support mount 29, which is supported rotatably around a rotational axis 52. The movement device 50 ensures a rotary movement of the support mount 29. The rotary movement can be a movement around a specific angle arc or a uniform rotation around the rotational axis 52 as well. The movement vector 55 is depicted here as a superposition of the local directional tangents to an arc-shaped or circular scanning track. The scanning body 21 is attached to the support mount 29. The scanning body 21 can, therefore, be configured, similarly to the scanning body of the first embodiment depicted in FIG. 1, as a transparent plate with several sampling areas 22, for example. The sampling areas 22 are guided through the light beam 10 by means of the rotary movement. Every sampling area 22 spans a scanning surface 25 with the movement vector 55, and therefore with the local directional tangents of the scanning track. For the purpose of greater clarity, only one scanning surface 25 is depicted in FIG. 12. The support mount 29 is depicted in FIG. 12 as a body with a hexagonal base surface, but can also be any other shaped body. The support mount 29 can consist of a transparent material, so that the sampled light from the light samples extracted from the cross-sections 14 by the sampling areas 22 can pass through the support mount 29, and a portion of the sampled light falls on the light sensor 60. The light sensor 60 can be positioned in a suitable position along the rotational axis 52. The light sensor can thus be positioned in a fixed manner and does not have to be coupled with the rotary movement. The support mount 29 can also be a hollow body or a body with channels for the guiding of the sampled light. The support mount 29 can also be a type of cage that accommodates the scanning body 21.

Figure 13:
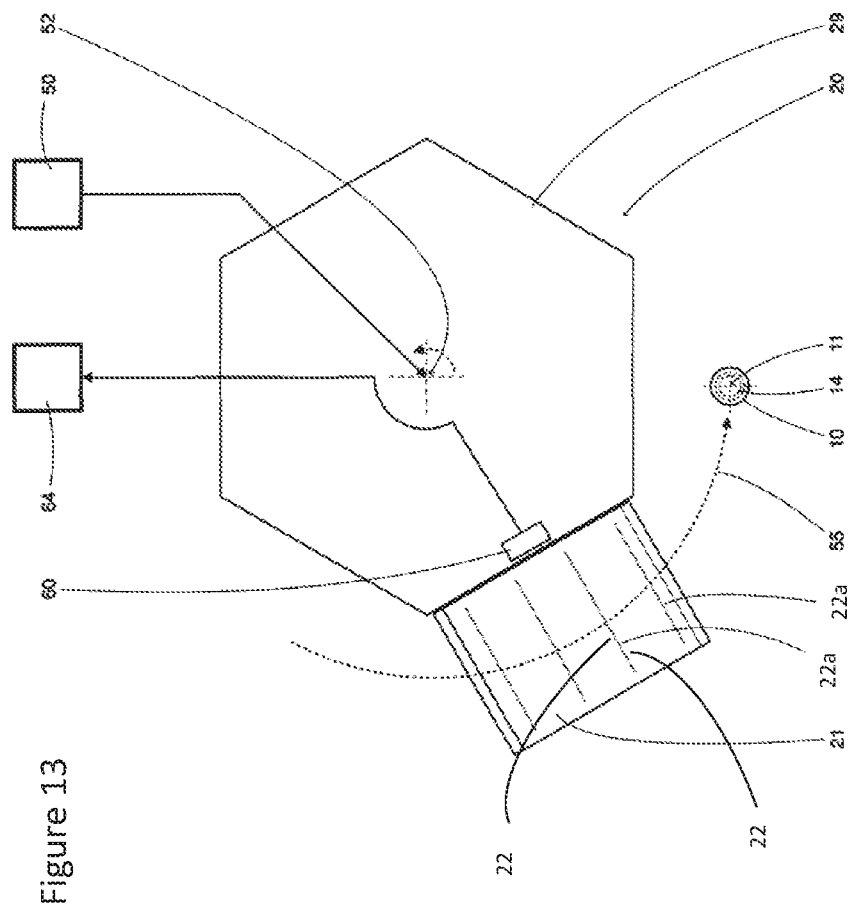
FIG. 13 is a schematic view from above of a third embodiment of the invention similar to the embodiment depicted in FIG. 12.

FIG. 13 depicts a schematic view from above of the device in accordance with the invention in a third embodiment, similarly to the embodiment depicted in FIG. 12. In contrast to FIG. 12, the light sensor 60 in this example is positioned on the support mount 29 in the vicinity of the scanning body 21. For the rest, the example of implementation corresponds the embodiment depicted in FIG. 12.

Figure 14:
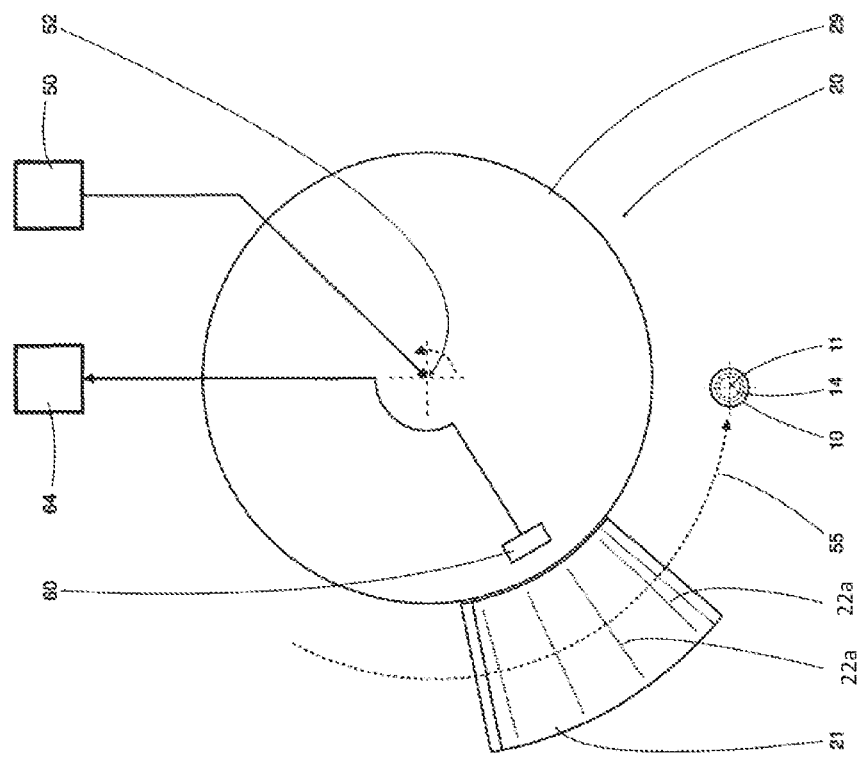
FIG. 14 is a schematic view from above of a third embodiment of the invention with a helicoidal plate as a scanning body.

An additional example of a third embodiment of the invention, similar to the example depicted in FIGS. 12 and 13, is depicted in FIG. 14. FIG. 14 depicts the example of implementation in a schematic view from above, in order to make clear the differences from the example of implementation of FIG. 13. The scanning body 21 here is configured as a type of helicoidal plate. The sampling lines 22a or the sample axes of the sampling areas 22 of the scanning body 21, are oriented radially to the rotational axis 52. By that means, the effective scanning directions, that is to say, the normal directions of the sample axes in the respective scanning surfaces, always have the same direction upon traversing the beam cross-sections 14 and in this case, therefore, are always tangential to the movement vector 55. The support mount 29, which is depicted in FIG. 14 with a round cross-section, can therefore be a cylindrical body or a cylindrical cage, for example. The support mount 29, however, can also have any other form. For the rest, this example of implementation corresponds to the embodiment depicted in FIG. 13.

Figure 15:
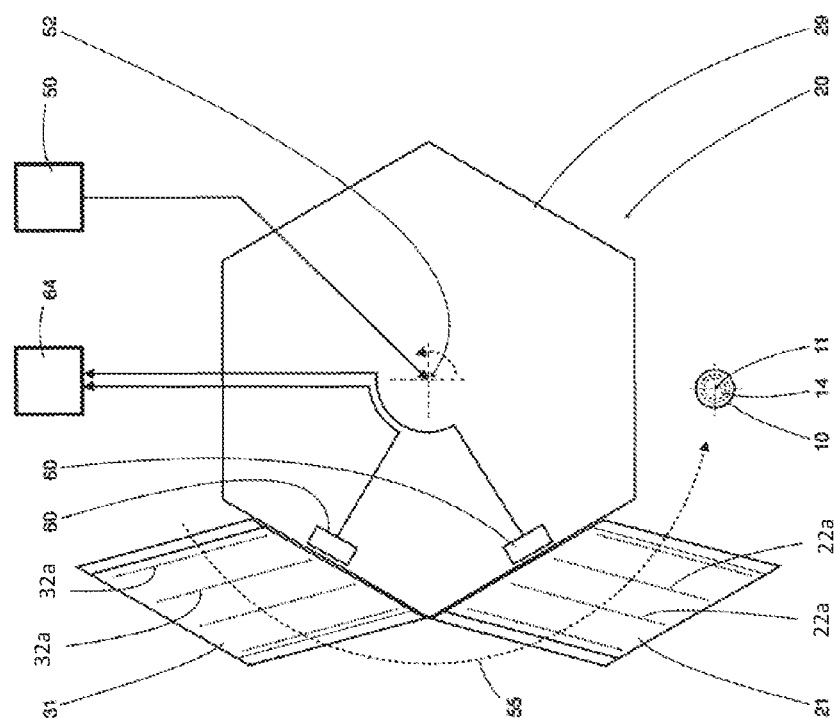
FIG. 15 is a schematic view from above of a fourth embodiment of the invention, in which the relative movement is executed by a rotary movement of the beam scanner and in which the beam scanner has two scanning bodies.

FIG. 15 depicts a schematic view from above of the device in accordance with the invention in a fourth possible embodiment. In this embodiment, the relative movement is a rotary movement similar to that of the embodiment depicted in FIGS. 13 and 14. The beam scanner 20 here comprises a scanning body 21 and a second scanning body 31, which are both designed as transparent trapezoidal plates each with several sampling areas 22 or 32, respectively. Both scanning bodies 21, 31 are positioned on a support mount 29, which is supported rotatably around a rotational axis 52. Every scanning body 21, 31 is, in this example of implementation, assigned its own light sensor 60, which can be attached to the support mount 29, for example. The scanning bodies are variously positioned obliquely to the support mount 29. The sampling areas 22 of the scanning body 21 are inclined, on average, approximately 45° to the movement vector 55, while the second sampling areas 32 of the second scanning body 31 are, on average, are oriented to the movement vector 55 by approximately −45°. Two different effective scanning directions are thereby provided, as schematically depicted in FIG. 9. An elliptical beam can consequently also be measured with the embodiment depicted here if the primary axes of the elliptical cross-sections 14 are suitably aligned.

Figure 16:
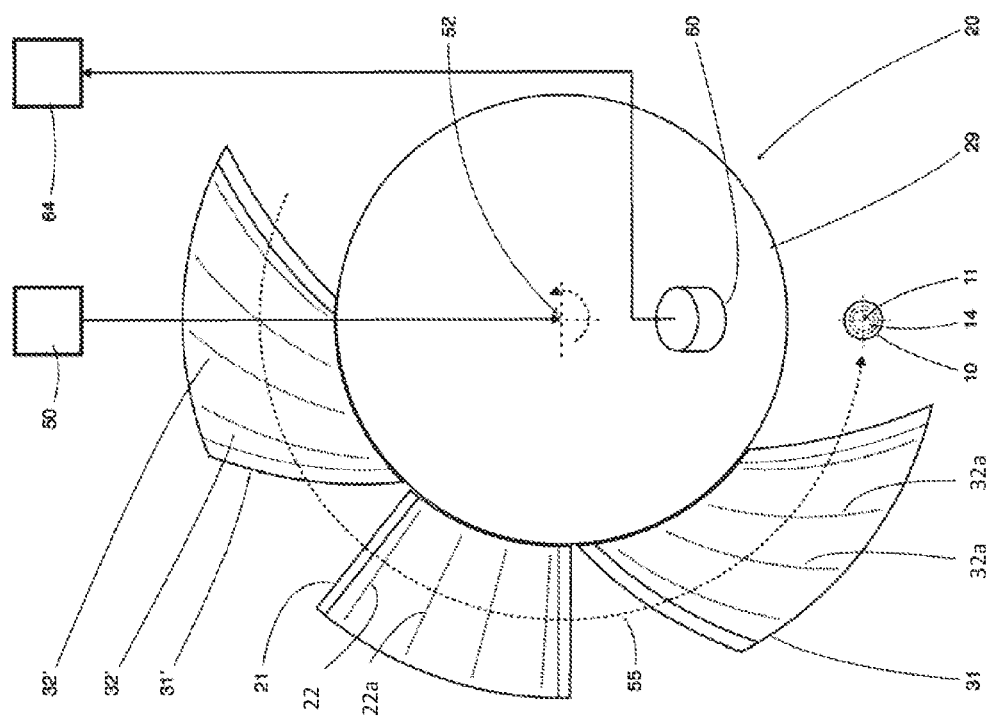
FIG. 16 is a schematic view from above of a fifth embodiment of the invention with several helicoidal plates as scanning bodies, which are angled in relation to one another.

A fifth possible embodiment of the invention is depicted in a schematic view from above in FIG. 16. In this embodiment, the beam scanner 20 has three scanning bodies 21, 31, 31', which are attached to a rotationally supported support mount 29. The scanning bodies 21, 31, 31' are designed here as various helicoidal plates, which are positioned variously obliquely on the support mount 29. The sampling areas 32 of the scanning body 31 are inclined by 45° to the movement vector 55 at every possible scanning point. Slightly curved sampling areas 32 thereby result. The axes of the sampling areas 22 of the scanning body 21 are, at every possible scanning point, perpendicular to the movement vector 55 or, or in other words, the sampling areas 22 are aligned radially to the rotational axis. The sampling areas 32' of the scanning body 31' are, in turn, aligned to every possible scanning point by −45° to the movement vector 55, and are thus slightly curved in a reverse orientation. In this embodiment, three different effective scanning directions are thereby provided. This corresponds to the scanning configuration depicted in FIG. 10. An elliptical or astigmatic light beam 10 can consequently be measured with any arbitrary orientation of the primary-axes of the elliptical beam cross-sections. Since only one sampling area of the various sampling areas 22, 32, 32' always traverses the light beam 10 at any given point in time, one light sensor 60 is, in principle, sufficient for the detection of the sampled light. For that purpose, the light sensor 60 can be positioned in a fixed position oriented to the light beam 10.

Figure 17:
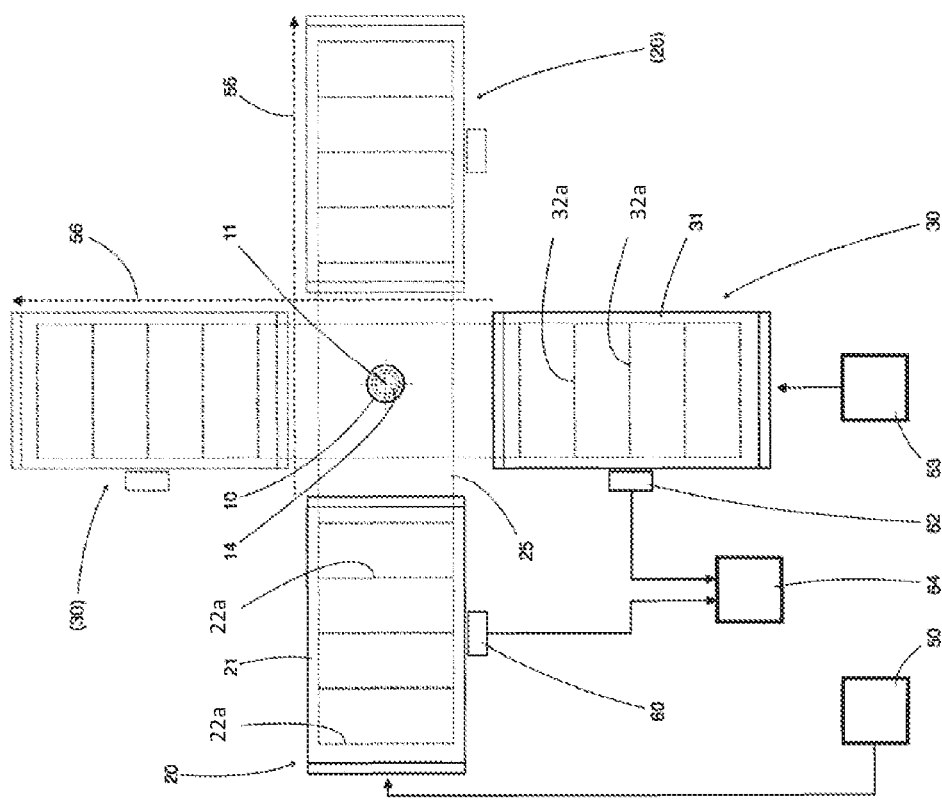
FIG. 17 is a schematic view from above of a sixth embodiment of the invention with two beam scanners, which scan a light beam in two different directions in succession.

FIG. 17 depicts a sixth possible embodiment of the invention in a schematic view from above. The apparatus has two beam scanners 20, 30 here, as well as two movement devices 50, 53. The beam scanner 20 and the second beam scanner 30 are configured identically. The design of the two beam scanners 20, 30 can, for example, correspond to the design of the beam scanner 20 of the first embodiment, which is depicted in FIGS. 1, 2a and 2b. The two beam scanners scan the light beam 10 in different directions 55, 56. The signal of the light sensor 60 of the beam scanner 20, as well as the signal of the second light sensor 62 of the second beam scanner 30, can be recorded by the same device 64 for recording the signal.

Figure 18:
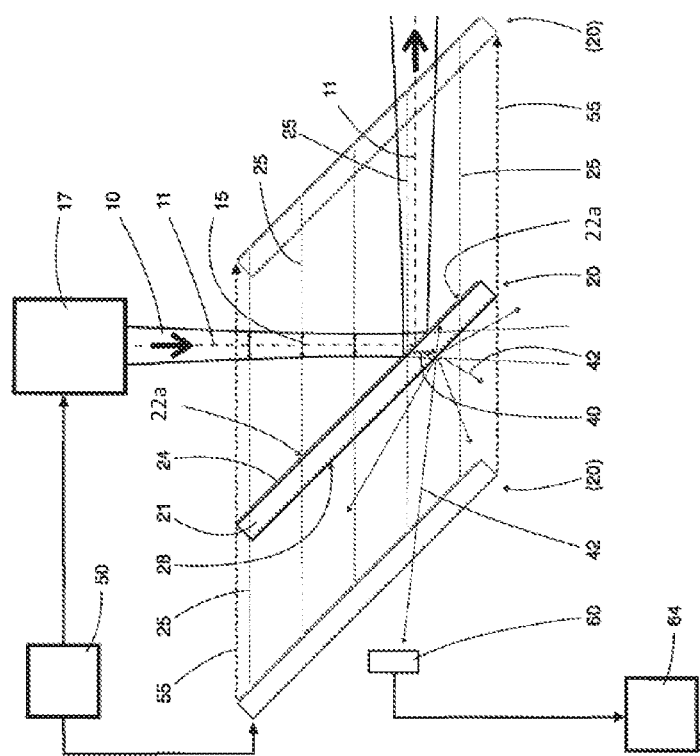
FIG. 18 is a schematic lateral view of an additional embodiment of the invention with a scanning body, in which the sampling areas are formed by narrow gaps in a reflective coating of the scanning body.

Finally, in FIG. 18, a further embodiment of the invention is depicted in a schematic lateral view. The embodiment resembles the first embodiment, which is depicted in FIGS. 1, 2a and 2b. The scanning body 21 of the beam scanner 20 is likewise designed here as a transparent plate. The sampling areas 22 differ significantly from the sampling areas previously depicted, however. The plate-shaped scanning body 21 is provided on a surface oriented to the light beam 10 with a highly reflective coating 24. The coating 24 is interrupted in several linear or strip-shaped areas. These interruptions of the highly reflective coating 24 form the sampling areas 22 here. During the scanning process, the scanning body 21 of the beam scanner 20 is guided through the light beam 10. The light beam 10 is thereby deflected to the side by the reflective coating 24 of the scanning body 21. If a sampling area 22 penetrates a beam cross-section, then a portion of the light beam 10 propagates into the scanning body 21 at the interruption in the coating 24. This linear or strip-shaped light sample from a cross-section of the light beam 10 forms the sampled light 40. A portion of the sample light 40 is guided to the light sensor 60. In the example depicted here, this is achieved by means of a light distributor 28, which can be configured as a roughening or matting on the opposite side of the plate-shaped scanning body, for example. The sampled light 40 is scattered on the light distributor 28. A portion of the scattered light 42 is detected by the light sensor 60. The light sensor 60 does not, therefore, have to be moved along with the beam scanner 20, but may instead be positioned in a fixed manner.

A solution is to be provided for the problem of determining the spatial dimensions of a light beam or laser beam directly in the focus range with a high precision and a short measuring period, particularly upon high beam powers.

For the solution of the task stated, a device is proposed which comprises a beam scanner 20, a light sensor 60, a movement device 50, and a device 64 for signal recording. The beam scanner 20 comprises at least one scanning body 21 with at least three sampling areas 22.

The sampling areas 22 extend along sampling lines 22a. The sampling lines can be straight or curved. A sample axis is defined as a local tangent on the sampling line. The sampling areas 22 can, for example, have a linear, strip-shaped, or bar-shaped form. The length or dimension in length of a sampling area is defined as the extent of the sampling area along the sampling line or in the direction of the sample axis, as the case may be. The width of a sampling area is defined as the extent of the sampling area transversely to the sampling line or perpendicularly to the sample axis, as the case may be. The length of the sampling areas 22 is significantly greater than the width of the sampling areas 22. The extent in length of the sampling areas 22 along the sampling lines 22a is greater than the width of the sampling areas 22 by at least a factor of ten. The extent in length can, for example, even be greater than the width of the sampling areas 22 by a factor 100 or higher. The width of the sampling areas 22 can, for example, be at least as great as the wavelength of the light beam to be scanned 10. The length of the sampling areas 22 can, for example, be at least twice as large as the diameter of the light beam 10 in the range of the light beam 10 to be measured. The width of the sampling areas 22 can be constant along the sampling line. The width of the sampling areas 22 can also be constant along the sampling line when averaged over a section along the sampling line, which section is at most equal to the width of the sampling area 22.

The movement device 50 provides a relative movement between the light beam 10 and the beam scanner 20. By that means, the beam scanner 20 is either guided through the light beam 10 or the light beam 10 is guided across the beam scanner 20. The movement device 50 can therefore be a drive device, for example, by means of which the beam scanner 20 is moved. The movement device 50 can also be a device, which is configured for the controlling of the position of the light beam 10. It can be a guiding machine, which moves the device 17 for the transmission of the light beam 10 and thus a robot, for example, which guides a laser processing optics. A scanner can also be used to control the beam movement. The movement there can be a linear, arc-shaped, or rotary movement. The temporal course of the movement can be an individual sequence or a cycle of movement, it can be a periodic movement, or a continuous movement, such as upon a rotary movement or rotation. A movement vector 55 of the relative movement is defined by means of the local tangent on the scanning tracks, which are produced by the relative movement in the space.

Upon an individual movement sequence, all, or as many as possible, but at least three of the sampling areas 22, traverse the light beam 10 in succession. A maximum of one sampling area is thereby positioned within the beam caustic of the light beam 10 at any specific point in time. For this purpose, proximate sampling areas 22 have a transverse distance 23 from one another that is greater than the diameter 15 in the range to be scanned of the light beam 10. The transverse distance 23 is defined as the distance of the sampling areas in the projection onto a plane perpendicular to the axis 11 of the light beam 10 along the track of the light beam 10 which is formed by the relative movement. In this way, by means of the extraction of light samples from the beam cross-sections by the sampling areas 22, individual light pulses or signal pulses, respectively, are produced, which are temporally separated from one another and consequently can be precisely evaluated and be assigned to the corresponding cross-section 14. The sampling areas 22 traverse different cross-sections 14 of the light beam 10—that is to say, the cross-sections 14 penetrated by the sampling areas 22 lie on different positions along the axis 11 of the light beam 10. For that purpose, the sampling areas 22 have non-zero distances from each other in the direction of the axis 11 of the light beam 10. One sampling area 22 spans a virtual surface with the movement vector 55 of the relative movement, which forms a scanning surface 25. At least three of the scanning surfaces 25 have a distance 26 from one another in the direction of the axis 11 of the light beam 10, so that at least three cross-sections surfaces of the light beam 10 are scanned on different z positions (positions along the axis 11 of the beam). Upon the traversing of a sampling area 22 through a beam cross-section 14, a linear or strip-shaped light sample corresponding to the form of the sampling area 22 is extracted from the cross-section 14. For this purpose, the sampling area 22 guides portions of the light beam 10 in directions that diverge from those of the primary direction of propagation of the light beam 10. The light guided from the sampling area 22 into diverging directions forms the sampled light 40. A portion of the sampled light 40 impinges on the light sensor 60 and is converted into an electrical signal by the light sensor 60, which level is proportional to the quantity of the sampled light 40 that is received. The light sensor 60 can be a photodiode, for example. The electrical signal is recorded by the device 64 for signal recording.

The temporal course of the signal of the light sensor 60 consists of several signal pulses. Every signal pulse corresponds to a cross-section 14 of the light beam 10 scanned by a sampling area 22. The momentary signal level is proportional to the intensity distribution in the beam cross-section integrated along the sampling line. The temporal course of the signal reproduces the integrated intensity distribution in the beam cross-section in the direction perpendicular to the sample axis. The direction perpendicular to the sample axis is therefore the effective (that is to say, the efficacious) scanning direction 27, in which the dimensions of the beam cross-sections 14, and thus the beam diameter 15, for example, can be determined. For the determination of the beam diameter, the temporal duration of an individual signal pulse is determined in accordance with a suitable criterion, such as by the determination of the points at which the intensity has dropped to 13.5% (or to $1/e^2$, respectively) of the maximum intensity, for example. The beam diameter 15 results from the pulse duration multiplied by the effective scanning speed. The effective scanning speed is the velocity component of the relative movement that is effective in the effective scanning direction 27 between the beam scanner 20 and the light beam 10. If the sample axes is not perpendicular to the movement vector 55 of the relative movement, but rather at an angle $\alpha$, then a factor $\sin(a)$ is accordingly to be considered upon the determination of the effective scanning speed.

The scanning speed can, for example, be supplied by the movement device 50 for the computation of the dimensions of the beam cross-sections. The scanning speed can also be determined by means of an additional device for the detection of the relative movement. A position sensor can, for example, be coupled with the beam scanner 20 or with the device 17 for the transmission of the light beam 10.

The effective scanning speed can also be determined from the signal of the light sensor 60. The effective scanning speed results from the quotients from the known transverse distances 23 of the sampling areas 22 and the temporal intervals of the signal pulses in the course of the signal.

Upon more precise consideration, the width of the sampling areas 22 are to be taken into consideration upon the determination of the beam dimensions from the signal pulse duration. The width of the sampling areas 22, and thus the extent of the sampling areas 22 transversely to the sampling line, influences the pulse duration of the signal as a scanning function. The signal is a convolution of the intensity distribution sought and the scanning function of the sampling areas. For the precise determination of the beam dimensions, therefore, the width of the sampling area must be arithmetically removed or a deconvolution must be carried out. One additional possibility consists of configuring the sampling area so narrowly that the influence on the signal pulse duration is negligible. If the beam has a Gaussian intensity distribution and the scanning function likewise has a Gauss-like form, then the resulting—that is to say, the broadened—signal pulse width can be easily computed:

$$b_{Signal} \approx (b_{Beam}^2 + b_{Sample}^2)^{1/2} \tag{Formula 2a}$$

The $b_{Signal}$ is the resulting signal pulse width, $b_{Beam}$ is the dimension of the beam cross-section in the scanning direction, and $b_{Sample}$ is the width of the scanning function, which is approximately equal to the width of the sampling areas 22.

The dimension of the beam cross-section that is sought, and thus the diameter of the beam cross-section, can correspondingly be computed with the following formula:

$$b_{Beam} \approx (b_{Signal}^2 - b_{Sample}^2)^{1/2} \tag{Formula 2b}$$

For example, the increase of the signal pulse width amounts to only approximately 12% if the width of the scanning function is half the diameter of the beam cross-section. It is thus provided, in one embodiment of the invention, that the sampling areas 22 have an extent transversely to the sampling line that is, at most, half the smallest beam diameter of the light beam to be scanned 10. If the width of the scanning function is ⅕ of the diameter of the beam cross-section, for example, then the broadening of the signal pulse amounts to approximately 2%. If the width of the scanning function is only 1/10 of the diameter of the beam cross-section, then the broadening of the signal pulse only amounts to approximately 0.5% and can be disregarded. Embodiments of the invention are also provided in which the sampling areas 22 have an extent transversely to the sampling line, which is equal to a maximum of one fifth, or a maximum equal to one tenth, of the smallest beam diameter of the light beam to be scanned 10.

Additional parameters can be determined from the beam dimensions determined in the various cross-section planes of the light beam, such as the beam propagation factor, the beam parameter product, the far field divergence angle, the diameter of the waist of the beam, and the axial position of the waist of the beam, for example. For this purpose, an adjustment or a fit of a hyperbolic function, such as in Formula 1, is carried out on the beam dimensions determined.

A hyperbolic function, such as Formula 1 for the description of the beam caustic, contains three independent parameters. At least three measuring points are thus necessary for the determination of the parameters. Therefore, the scanning body 21 has, in the simplest embodiment of the invention, at least three sampling areas 22. For the testing of the value of the fit to the measuring points, a greater number of measuring points is necessary. Embodiments are also provided, in which the scanning body 21 has at least four or at least six sampling areas 22, for example.

The norm ISO 11146 provides that a determination of beam diameters should be carried out on at least 10 different positions along the beam axis. An embodiment is thus also provided in which the scanning body 21 has at least 10 sampling areas 22. An additional increase of the precision of the hyperbolic fit can be achieved through a still greater number of measuring points. Thus, for example, 20 or even more sampling areas 22 can be provided.

In order for the hyperbolic fit to provide parameters with sufficient precision, the measuring points must cover a reasonable range of the beam caustic. For this purpose on the one hand, the waist of the beam of the light beam 10 to be measured should lie within the measuring points and, otherwise, the measuring points must also cover a range, in which the diameter of the beam varies significantly. For this purpose, the range covered by measuring points should comprise at least one Rayleigh length of the light beam 10. It is thus provided that the distance between the scanning surfaces 25, which are spanned by the sampling lines 22a of the sampling areas 22 and which are positioned at the greatest distance in the direction of the axis 11 of the light beam 10, corresponds to at least one Rayleigh length of the light beam 10 to be scanned.

The norm ISO 11146 provides, furthermore, that approximately half of the measuring points should be located within one Rayleigh length on every side of the waist of the beam, and that the other half of the measuring points should be distributed over two Rayleigh lengths beyond the waist of the beam. Embodiments of the invention are thus provided, in which the distance 26 between proximate scanning surfaces 25 multiplied by the number of the sampling areas 22 of the scanning body 21, or the distance between the scanning surfaces 25 positioned at the greatest distances from each other, for example, correspond to at least two, to at least four, or to at least six Rayleigh lengths of the light beam 10 to be scanned.

The scanning body 21 consists of a material transparent for the light beam 10, such as an optical glass, for example. The material of the scanning body 21 has a low absorption, in order to also be able to scan light beams with very high intensity such as laser beams, for example, in the multi-kilowatt range. The absorption of the light beam 10 upon the impinging on the scanning body 21 or upon the transmitting of the scanning body 21 can amount to less than 0.1% or less than 1000 ppm (ppm=parts per million), respectively. Suitable materials for the scanning body 21, for example, are quartz glass, particularly synthetically produced fused silica, as well as other crystal glasses and optical glasses with high transmission level. A low absorption, in particular, is achievable with the use of quartz glass; many quartz glasses have an absorption of below 100 ppm/cm, and some even below 10 ppm/cm.

The shape of the scanning body 21 can be designed in different ways. FIGS. 1, 7 and 12 depict embodiments with a plate-shaped scanning body 21, for example. The surfaces of the scanning body can be flat or curved, or have a complex surface form. For example, the scanning bodies in the embodiment depicted in FIGS. 14 and 16 are configured as helicoidal plates. The scanning body can also be block-shaped, such as in the form of a cuboid, as depicted in FIG. 6, for example, or have another form, such as a prismatic form. The surfaces of the scanning body 21, through which the light beam 10 passes, particularly the surface on which the light beam 10 exits from the scanning body 21, can be provided with a reflection-reducing coating.

The sampling areas 22 can be positioned in the interior of the scanning body 21, such as in the embodiment of FIG. 6. The surface through which the light beam 10 enters into the scanning body is then preferably flat, so that the parameters of the light beam are changed to the smallest extent possible. The sampling areas 22 can also be positioned as close as possible to a surface of the scanning body 21, particularly close to the light beam entry surface, as depicted in FIGS. 1, 7 and 12. The sampling areas 22 can also be positioned directly on a surface of the scanning body 21. Such a possible embodiment of the invention is depicted in FIG. 18.

The sampling areas 22 can, for example, have a light-deflecting structuring or a light-scattering structuring. The material within the sampling areas 22 can be the same material as the optical transparent material of the scanning body 21. Inside or at the edge of the sampling areas 22, the light from the light beam 10 is at least partially deflected by the light-deflecting structuring in a direction that diverts from the primary direction of propagation of the light beam 10. The light-deflecting effect of the structuring can, for example, be based on refraction, reflection, scattering, or luminescence. The density or the refractive index can have local changes within the sampling areas 22 for example. The light-deflecting structuring can also be formed by a rough boundary or surface. The light-deflecting structuring can, furthermore, be formed by voids, cracks or other imperfections in the material. The material within the sampling areas 22 can also be a completely or partially different material than the material of the scanning body 21. The material within the sampling areas 22 can also have a doping. The light-deflecting structuring of the sampling areas 22 can also be formed by fluorescence converters in the material within the sampling areas 22, so that the light diverted, that is to say, the sampled light 40, has a different wavelength than the light beam 10. The light-deflecting structuring within the sampling areas 22 does not have to be completely uniform, isotropic, or spatially constant. The light-deflecting structuring is uniform along the sampling line or at least uniform along the sampling line upon averaging over a short range along the sampling line that is smaller than or equal to the width of the sampling area 22. The light-deflecting structuring within the sampling areas 22 can also be formed by structural details which are distributed along the sampling line or repeat similarly along the sampling line. A structural detail can, for example, be a microscopic crack or void in the material, or a microscopic change in regard to density, refractive index or doping. The structural details can also partially overlap in space, but can also be positioned at a distance from one another, wherein the distance is less than or equal to the width of the sampling area 22.

One possibility for the production of the sampling areas 22 is so-called glass internal engraving. In this method, a pulsed laser beam is focused inside the optical transparent material, on a very small area, such as a diffraction-limited spot. An imperfection can be produced in the focused area through the extreme pulse power densities thereby appearing. The area of the change can be narrowly limited through the use of non-linear effects. It is thereby possible to produce imperfections with dimensions in the range of approximately 1 µm to a few 10 µm. The imperfections produced can be hollow cavities, cracks, cloudings, or even local approximately spot-like changes in the density and/or in the refractive index of the material.

One additional possibility for the production of the sampling areas 22, particularly, if the sampling areas 22 are positioned on a surface of the scanning body 21, consists of selective etching. With so-called selective laser etching, in particular, small and precise structures can be produced. Upon selective laser etching, the etchability is highly increased in a first step by means of a local laser pulse treatment and, in a second step, the material spots treated are removed by means of chemical etching. Thus, very precise grooves, furrows, or strip-shaped recesses, which form the sampling areas 22, can be produced on a surface of the scanning body 21, for example.

The sampling areas 22 can also be formed by linear or strip-shaped changes in the degree of reflection of a surface or boundary surface of the scanning body 21. For example, a surface of the scanning body 21 can be provided with a reflective coating 24. The sampling areas 22 can then be formed by linear or strip-shaped interruptions of the reflective coating 24, such as in the embodiment depicted in FIG. 18, or by means of linear or strip-shaped changes in the coating 24, which can be produced by means of scratching or etching, for example. Conversely, the sampling areas can also be formed by linear or strip-shaped coatings on a surface of the scanning body 21, through which the degree of reflection of the surface can be reduced or increased on these areas.

The movement vector 55 of the relative movement, which can be provided by the movement device 50, is oriented transversely to the axis 11 of the light beam 10. The movement vector 55 can, for example, be positioned at an angle of 90°, and thus perpendicularly to the axis 11 of the light beam 10, but another angle in the range of 45° to 135° or in the range of −45° to −135° to the axis 11 of the light beam 10, respectively, can also be provided.

The sampling lines 22a of the sampling areas 22 are aligned transversely to the axis 11 of the light beam 10. The sampling lines 22a can, for example, be positioned perpendicularly to the axis 11 of the light beam 10, but another angle in the range of 45° to 135° or in the range of −45° to −135° to the axis 11 of the light beam 10, respectively, can also be provided.

The sampling lines 22a of the sampling areas 22 are aligned at non-zero angles to the movement vector 55. The sampling lines 22a can, for example, be positioned at an angle of 90° or perpendicularly to the movement vector 55. The sampling lines, however, can also be positioned at an angle in the range of 10° to 170° or in the range of −10° to −170°, respectively, to the movement vector 55.

Since the sample axes are the local tangents on the sampling lines 22a, an angle to a sampling line is identical to an angle to the sample axis if the sampling lines are straight. Upon curved sampling lines, an angle to the sampling line is to be understood as an angle to the local tangent on the sampling line, and thus an angle to the sample axis.

The light sensor 60 can be positioned in a fixed manner, for example. The light-sensitive receiving surface of the light sensor 60 is oriented towards the range of the light beam 10 to be scanned. Upon the movement of the beam scanner 20 through the light beam 10, a small spatial angle portion of the sampled light 40 produced or the scattered light 42 illuminates the light sensor 60. The light sensor 60 can also be moved along with the beam scanner 20. The light sensor 60 can, for example, be positioned on a lateral surface of the scanning body 21. In this case, the light sensor 60 primarily receives sampled light 40, which propagates inside the scanning body 21. Upon the propagation of the sampled light 40 inside the scanning body 21, a total internal reflection can appear, through which the loss of light is reduced and the ratio of the signal of the sampled light to an underground signal, which can be caused by ambient light or general stray light, is improved. Several light sensors 60 can also be used.

The measurement of a laser beam with a high beam quality and with approximately 20 W power by means of aa apparatus in accordance with the invention is depicted in FIGS. 4a, 4b and 5. The measuring apparatus essentially corresponds to the embodiment depicted in FIGS. 1, 2a, 2b and 3. In the measuring apparatus, a rectangular plate of quartz glass, which is equipped with 21 sampling areas 22 positioned in parallel, was used as a scanning body 21 for the beam scanner 20. The sampling areas 22 are individual lines spaced at an interval distance of 1.0 mm with a width of approximately 15 µm and inscribed just below the surface by laser-internal engraving in the scanning body. The plate is inclined by 45° to the axis 11 of the laser beam 10. Consequently, both the transverse distance 23 between the sampling areas 22, as well as the distance 26 between the proximate scanning surfaces 25, amount to approximately 0.707 mm. With this beam scanner 20, a light beam 10 can consequently be sampled over a length of 14 mm in one movement sequence. In the measuring apparatus, the beam scanner 20 is positioned in a fixed manner with the scanning body 21 and the light sensor 60. The laser beam 10 was guided across the beam scanner 20 by means of the device 50, in this case a scanner.

FIG. 4a depicts the signal of the light sensor 60 recorded by the device for signal recording 64. A light pulse is produced upon every traverse of a sampling area. The entire measuring signal consequently consists of 21 pulses, from the duration of which the respective beam diameter can be determined. FIG. 4b depicts, by way of example, the sixth signal pulse from the recorded signal course and illustrates one possibility for the determination of the pulse duration. The signal course can, in this signal pulse, be approximated by a Gaussian curve. The determination of the pulse duration can be carried out, for example, by searching the points at which the signal has dropped to $1/e^2$, and therefore to 13.5% of the signal peak value. The determination of the pulse duration can also take place in another way, such as through computation of the $2^{nd}$ momentum, for example, or by means of other common methods. The pulse duration $t_{Pulse}$ determined for the sixth signal pulse is 0.0125 seconds, from which a beam diameter of 125 µm or a beam radius $w_{Beam}$ of 62.5 µm with the scanning speed of 0.01 m/s results. The broadening of the signal pulse through the scanning with a sampling area of 15 µm width leads, at this beam cross-section sampled, to an error of only approximately 0.7%. In the same way, the beam radii for all cross-sections sampled was determined and a hyperbolic fit to the measuring values was carried out. FIG. 5 depicts a plot of the beam radii against the axial position and the hyperbolic fit (dotted curve). The beam parameters resulting from that are: focus position $z_0$ 8.2 mm, waist radius $w_0$ 37.2 μm, Rayleigh length $Z_R$ 3.85 mm, far field divergence full angle 19.3 mrad, beam parameter product 0.359 mm*mrad, mode factor or beam propagation factor $M^2$ 1.06. The comparison with a measuring device for the beam measurement of conventional design type, in which the beam caustic was scanned point-by-point with a pinhole, yielded practically identical measuring values, with deviations in the range of less than 5%.

The beam caustic was scanned over a range of approximately 3.5 Rayleigh lengths. Approximately half of the measuring points were located in the range of one Rayleigh length on both sides of the waist of the beam. The measuring conditions proposed by the norm ISO 11146 are thereby fulfilled. The scanning lasted approximately 1.5 seconds. Additional measurements with different scanning speed of up to 0.5 m/s were carried out, which reproduced the findings within narrow limits. Upon a scanning speed of 0.5 m/s, a scanning duration of only approximately 0.03 seconds results. Consequently, the device in accordance with the invention makes possible spatial beam measuring within a very short measuring time, such as only 30 ms, for example. Furthermore, the invention makes possible a beam measuring with high reproducibility and with high precision.

The invention consequently has numerous advantages:

- The beam parameters can be measured directly and without change of the beam in the range of interest that generally is focus area of a light beam or laser beam. No lenses or other elements that change the beam parameters and, upon high powers of the light beam, can cause thermally induced measuring errors, are required.
- The invention makes possible a scanning of the light beam with very high spatial resolution, so that a highly precise beam measuring can be carried out, even in beams with a small waist of the beam or small focus diameter, as the case may be.
- The invention makes possible very rapid measurements, so that a complete beam caustic can be sampled within a few milliseconds.
- The invention is suitable for the direct beam measuring of multi-kilowatt lasers, even in the focus of the beam.
- The beam measuring is in conformity with the norm ISO 11146.

The invention can be advantageously further developed in the most varied ways without leaving the scope and the task of the invention. Additional embodiments and design possibilities are depicted in the figures and explained in the descriptions of the figures, wherein the invention is not restricted to the embodiment depicted. Different characteristics or embodiments depicted in the figures can also be combined in order achieve additional possible embodiments of the invention.

In the measuring of rotationally symmetrical beams, the determination of dimensions of the beam cross-sections in only one effective scanning direction is sufficient for the complete characterization of the beam.

If the beam is elliptical or astigmatic, then the beam cross-sections generally have an elliptical form, so that at least two effective scanning directions are necessary for the determination of the dimensions of the beam cross-sections. For that purpose, different possible embodiments of the invention are provided.

In one possible embodiment, which is depicted in FIGS. 7, 8a, 8b and 9, the beam scanner 20 comprises, in addition to the scanning body 21, a second scanning body 31. The second scanning body 31 has second sampling areas 32, which are configured similarly to the sampling areas 22. The second sampling lines 32a or the second sample axes of the second sampling areas 32, respectively, however, are aligned at a different angle to the movement vector 55 of the relative movement than the sampling lines 22a or the sample axes of the sampling areas 22, respectively. The light beam 10 can consequently be scanned successively in two different effective scanning directions 27 and 37 with one individual relative movement. In the example of the FIGS. 7, 8a, 8b and 9 the sampling areas 22 and the second sampling areas 32 form an angle of 90°, so that the effective scanning directions 27 and 37 are perpendicular to one another.

FIG. 15 depicts an additional embodiment for the provision of two different effective scanning directions with relative movement. In this embodiment, the beam scanner 20 also comprises two scanning bodies 21 and 31. The relative movement is a rotary movement of the beam scanner 20 in this embodiment.

Yet another embodiment of the invention for the provision of two different effective scanning directions is depicted in FIG. 17. In this embodiment, the apparatus comprises two beam scanners 20 and 30, to each of which a specific movement device 50 and 53 for the execution of a relative movement is assigned. Each beam scanner 20 and 30 comprises a scanning body 21 or 31, respectively. The beam scanners 20 and 30 can, in principle, be configured identically. By means of the two movement devices 50 and 53, two different directions of movement are supplied by the movement vectors 55 and 56, so that the light beam can be scanned in succession in two different directions.

Although elliptical beam cross-sections can be measured with the last three described embodiments, but for that purpose the primary axes of the ellipses have to be aligned in the direction of the effective scanning directions, as has already been explained in the description to FIG. 9. For the measuring of elliptical beam cross-sections with any arbitrary orientation, a third effective scanning direction is necessary, as is depicted, in principle, in FIG. 10.

FIG. 16 depicts an embodiment provided for that purpose. In this embodiment, the rotationally supported beam scanner 20 comprises three scanning bodies 21, 31, 31', each with several sampling areas 22, 32, 32'. The sampling areas belonging to one scanning body are each identically aligned with the movement vector 55, and sampling areas of different scanning bodies are oriented at different angles to the movement vector 55. Three different effective scanning directions 27, 37, 37' thereby result. The scanning pattern consequently corresponds to the pattern depicted in FIG. 10, with the difference that the sampling areas 22, 32, 32' are guided on a circular scanning track. The sampling areas of the scanning bodies 31, 31' themselves are slightly curved here, so that the angle of the sampling areas 32, 32' to the movement vector 55, and thereby the effective scanning directions for every scanning body on every possible scanning track remain equal.

The number of different scanning directions can be further increased, for example, by adding additional scanning bodies to a beam scanner as in FIG. 16, with sampling areas that are positioned at another angle to the movement vector 55. FIG. 11, for example, depicts such a type of scanning schema, which supplies four scanning bodies with four different effective scanning directions, so that four different beam dimensions 16', 16'', 16''', 16'''' can be determined. The light beam 10 or the individually cross-sections 14, respectively, are thereby sampled, similar to tomographic processes, from different directions. With a sufficiently large number of different scanning directions, even the beam profile or the local intensity distribution in the beam cross-sections can be reconstructed by means of mathematical methods, which are known in similar form from tomographic processes.

The number of scanning directions can, in principle, be increased in various types and ways. On the one hand, the number of beam scanners can be increased. On the other hand, the number of scanning bodies of a beam scanner can be increased. Finally, several groups of sampling areas can be positioned, even inside one scanning body, wherein the sampling areas belonging to one group are each aligned identically and the sampling areas of different groups are aligned at different angles to the movement vector of the relative movement.

The three possibilities for the increase of the number of scanning directions can also be combined. For example, in accordance with one schema, similar to FIG. 17, two (or even more) beam scanners can be used, wherein every beam scanner is designed similarly to the beam scanner of the embodiment depicted in FIG. 7 with two (or even more) scanning bodies.

The invention claimed is:

1. Apparatus for the determination of spatial dimensions of a light beam, comprising
    a beam scanner;
    at least one light sensor;
    a movement device for the execution of a relative movement between the light beam and the beam scanner; and sensor;
    wherein the beam scanner comprises at least one scanning body with at least three sampling areas;
    wherein the sampling areas
    have an extent along sampling lines that is greater than the extent of the sampling areas transversely to the sampling lines by at least a factor of ten;
    are configured for the extraction of linear or strip-shaped light samples from cross-sections of the light beam; and
    have a transverse distance from one another that, in a projection of the sampling areas on a plane perpendicular to the axis of the light beam, is greater along a distance that the light beam travels by the relative movement than a diameter of the light beam in the range of the light beam to be scanned;
    wherein several scanning surfaces are defined by the sampling lines of the sampling areas, each spanned by a movement vector of the relative movement;
    wherein at least three scanning surfaces have a non-zero distance from one another in the direction of the axis of the light beam; and
    wherein the light sensor is configured for the detection of at least a portion of the sampled light of the light samples extracted by the sampling areas from the cross-sections of the light beam.

2. Apparatus according to claim 1, wherein the sampling areas are positioned at a surface of the scanning body or inside the scanning body.

3. Apparatus according to claim 1, wherein the range of the relative movement, which is executable by means of the movement device for the relative movement between the light beam and the beam scanner, is at least three times the transverse distance between proximate sampling areas.

4. Apparatus according to claim 1, wherein the sampling areas have an extent transversely to the sampling lines that is, at most, half the smallest beam diameter of the light beam to be scanned.

5. Apparatus according to claim 1, wherein the apparatus is configured for the successive scanning of at least three different cross-sections of the light beam by means of the sampling areas in an individual movement sequence of the movement device.

6. Apparatus according to claim 1, wherein the distance between the scanning surfaces, which are positioned at the greatest distance in the direction of the axis of the light beam, corresponds to at least one Rayleigh length of the light beam to be scanned.

7. Apparatus according to claim 1, wherein the movement vector of the relative movement is arranged at an angle between 45° and 135° or between −45° and −135° to the axis of the light beam.

8. Apparatus according to claim 1, wherein the sampling lines of the sampling areas are arranged at an angle of between 45° and 135° or between −45° and −135° to the axis of the light beam.

9. Apparatus according to claim 1, wherein the sampling lines of the sampling areas are arranged at an angle between 10° and 170° or between −10° and −170° to the movement vector of the relative movement.

10. Apparatus according to claim 1, wherein the sampling areas are configured for the guiding of at least a portion of the sampled light, which is extracted from the cross-section of the light beam by the sampling areas, in a direction diverging from the propagation of the entire light beam.

11. Apparatus according to claim 1, wherein the sampling areas have a light-deflecting structuring or a light-scattering structuring.

12. Apparatus according to claim 1, wherein the sampling areas are formed by linear or strip-shaped coatings on the scanning body.

13. Apparatus according to claim 1, wherein the sampling areas are formed by linear or strip-shaped gaps in a reflective coating of the scanning body.

14. Apparatus according to claim 1, wherein the scanning body has at least four sampling areas and wherein at least four scanning surfaces have a non-zero distance from one another in the direction of the axis of the light beam.

15. Apparatus according to claim 1, wherein the scanning body has at least ten sampling areas.

16. Apparatus according to claim 1, wherein the scanning body has an absorptance of a maximum of 0.1%.

17. Apparatus according to claim 1, comprising a second scanning body with at least three second sampling areas, wherein the second sampling areas have an extent along second sampling lines which is greater by a factor of at least ten than the extent of the second sampling areas transversely to the second sampling lines.

18. Apparatus according to claim 17, wherein the second sampling lines of the second sampling areas form a non-zero angle with the sampling lines of the sampling areas of the scanning body.

19. Apparatus according to claim 17, wherein several second scanning surfaces are defined by the second sampling lines of the second sampling areas each spanned by the movement vector, and wherein the second scanning surfaces and the scanning surfaces are positioned displaced from one another in the direction of the axis of the light beam.

20. Apparatus according to claim 17, wherein the second scanning body is a component of the beam scanner.

21. Apparatus according to claim 17, comprising a second beam scanner, as well as a second movement device for the execution of a second relative movement between the second beam scanner and the light beam, wherein the second scanning body is a component of the second beam scanner, and wherein a second movement vector of the second movement device forms a non-zero angle with the movement vector of the movement device.

22. Apparatus according to claim 1, wherein the relative movement is a linear movement.

23. Apparatus according to claim 1, wherein the relative movement is a rotary movement.

24. Apparatus according to claim 1, additionally comprising an evaluation device for the determination of at least one parameter from the following group of parameters of the light beam: dimensions of cross-sections of the light beam in a direction perpendicular to the sampling line, beam diameter in several positions along the axis of the light beam, axial focus position, focus diameter, divergence angle, beam parameter product.

25. Use of an apparatus according to claim 1 for the determination of spatial dimensions of a laser beam.

26. Method for the determination of spatial dimensions of a light beam, comprising the following method steps:
   executing a relative movement between a beam scanner and the light beam by means of a movement device;
   extraction of linear or strip-shaped light samples from several cross-sections of the light beam by means of several sampling areas, wherein the beam scanner comprises at least one scanning body with at least three sampling areas;
   detection of at least a portion of the sampled light of the light samples extracted by the sampling areas from the cross-sections of the light beam by means of a light sensor;
   recording of a temporally variable signal of the light sensor by means of a device for signal recording;
   wherein the sampling areas have an extent along sampling lines that is greater by at least a factor of ten than the extent of the sampling areas transversely to the sampling lines;
   wherein the sampling areas have a transverse distance from one another that, in a projection of the sampling areas on a plane perpendicular to the axis of the light beam, is greater along a distance that the light beam travels by the relative movement than a diameter of the light beam in the range of the light beam to be scanned;
   wherein several scanning surfaces are defined by the sampling lines of the sampling areas, each spanned by a movement vector of the relative movement; and
   wherein at least three scanning surfaces have a non-zero distance from one another in the direction of the axis of the light beam.

27. Method according to claim 26, wherein at least three different cross-sections of the light beam are successively sampled in an individual movement sequence of the movement device by means of the sampling areas.

28. Method according to claim 26, wherein the sampling areas have an extent transversely to the sampling line, that is, at most, half the smallest half beam diameter of the light beam to be scanned.

29. Method according to claim 26, additionally comprising the method steps:
   assignment of signal pulses in the recorded signal of the light sensor to sampled cross-sections of the light beam;
   determination of pulse durations of the signal pulses in the recorded signal of the light sensor;
   computing of the dimensions of the cross-sections from the pulse durations of the signal pulses and from a speed of the relative movement.

30. Method according to claim 29, wherein a beam propagation factor or a beam parameter product is computed from the dimensions of the cross-sections.

31. Method according to claim 26, additionally comprising the method step:
   extraction of linear or strip-shaped light samples from several cross-sections of the light beam by means of at least three second sampling areas of a second scanning body, wherein the second sampling areas have, along second sampling lines, an extent that is greater than the extent of the second sampling areas transversely to the second sampling lines by a factor of at least ten, and wherein the second sampling lines of the second sampling areas form a non-zero angle with the sampling lines of the sampling areas of the scanning body.

* * * * *